(12) United States Patent
Miyatake et al.

(10) Patent No.: US 11,154,852 B2
(45) Date of Patent: Oct. 26, 2021

(54) ANION EXCHANGE RESIN, ELECTROLYTE MEMBRANE, BINDER FOR FORMING ELECTRODE CATALYST LAYER, FUEL CELL ELECTRODE CATALYST LAYER AND FUEL CELL

(71) Applicants: University of Yamanashi, Kofu (JP); Takahata Precision Co., Ltd., Tokyo (JP); Daihatsu Motor Co., Ltd., Ikeda (JP)

(72) Inventors: Kenji Miyatake, Kofu (JP); Junpei Miyake, Kofu (JP); Naoki Yokota, Tokyo (JP); Katsuya Nagase, Tokyo (JP); Aoi Takano, Shiga (JP); Takeshi Kato, Shiga (JP); Koichiro Asazawa, Shiga (JP)

(73) Assignees: UNIVERSITY OF YAMANASHI, Yamanashi (JP); TAKAHATA PRECISION CO., LTD., Tokyo (JP); DAIHATSU MOTOR CO., LTD, Osaka (JP)

( * ) Notice: Subject to any disclaimer, the term of this patent is extended or adjusted under 35 U.S.C. 154(b) by 263 days.

(21) Appl. No.: 16/547,473

(22) Filed: Aug. 21, 2019

(65) Prior Publication Data

US 2020/0061599 A1   Feb. 27, 2020

(30) Foreign Application Priority Data

Aug. 27, 2018   (JP) .............................. JP2018-158413

(51) Int. Cl.
*B01J 41/13*   (2017.01)
*H01M 8/10*   (2016.01)
(Continued)

(52) U.S. Cl.
CPC ............... *B01J 41/13* (2017.01); *B01J 41/07* (2017.01); *B01J 47/12* (2013.01); *C08G 61/121* (2013.01);
(Continued)

(58) Field of Classification Search
CPC .......... B01J 41/13; B01J 41/07; B01J 47/12; H01M 8/1023; H01M 8/1039; H01M 4/8668; H01M 2008/1095; C08G 61/121
(Continued)

(56) References Cited

U.S. PATENT DOCUMENTS 7,973,088 B2 * 7/2011 Ikeuchi ............... H01M 8/1023
  521/27
10,287,409 B2 * 5/2019 Shimada ............. H01M 8/1023
(Continued)

FOREIGN PATENT DOCUMENTS

JP   2016-044224 A   4/2016

OTHER PUBLICATIONS

Lin et al. "A Soluble and Conductive Polyfluorene Ionomer with Pendant Imidazolium Groups for Alkaline Fuel Cell Applications", Macromolecules, 2011, 44, 9642-9649 (Year: 2011).*

*Primary Examiner* — Michael M. Bernshteyn
(74) *Attorney, Agent, or Firm* — Masuvalley & Partners

(57) ABSTRACT

Provided are an anion exchange resin being capable of producing an electrolyte membrane and the like, which have improved chemical properties (durability). For example, used is an anion exchange resin comprising a hydrophobic unit being composed of a plurality of divalent hydrophobic groups repeated via carbon-carbon bond, the divalent hydrophobic group having a plurality of aromatic rings which are connected to each other via a divalent fluorine-containing group; and a hydrophilic unit being composed of a plurality of hydrophilic groups repeated via carbon-carbon bond, the
(Continued)

hydrophilic groups being composed of a plurality of aromatic rings which are connected to each other via a divalent hydrocarbon group and/or carbon-carbon bond, and the hydrophilic groups containing an anion exchange group-containing group including a quaternary ammonium salt having a piperidine ring, and wherein the hydrophobic unit and the hydrophilic unit are connected via carbon-carbon bond.

20 Claims, 1 Drawing Sheet

(51) Int. Cl.
*B01J 41/07* (2017.01)
*B01J 47/12* (2017.01)
*C08G 61/12* (2006.01)
*H01M 4/86* (2006.01)
*H01M 8/1023* (2016.01)
*H01M 8/1039* (2016.01)
*H01M 8/1018* (2016.01)

(52) U.S. Cl.
CPC ....... *H01M 4/8668* (2013.01); *H01M 8/1023* (2013.01); *H01M 8/1039* (2013.01); *H01M 2008/1095* (2013.01)

(58) Field of Classification Search
USPC .......................................... 521/27
See application file for complete search history.

(56) References Cited

U.S. PATENT DOCUMENTS

| 10,734,663 B2 * | 8/2020 | Miyatake ............ H01M 8/1037 |
| 2009/0117438 A1 * | 5/2009 | Saito ................... H01M 8/1027 |
| | | 429/493 |
| 2012/0238648 A1 * | 9/2012 | Zhou ................. C08G 59/3218 |
| | | 521/27 |

* cited by examiner

ANION EXCHANGE RESIN, ELECTROLYTE MEMBRANE, BINDER FOR FORMING ELECTRODE CATALYST LAYER, FUEL CELL ELECTRODE CATALYST LAYER AND FUEL CELL

RELATED APPLICATIONS

This application claims priority to Japanese Patent Application No. JP2018-158413 filed Aug. 27, 2018, which is hereby incorporated herein by reference in its entirety.

TECHNICAL INVENTION

The present invention relates to an anion exchange resin, an electrolyte membrane, a binder for forming an electrode catalyst layer, a fuel cell electrode catalyst layer, and a fuel cell.

BACKGROUND ART

The anion exchange resin comprising divalent hydrophobic groups being composed of one aromatic ring, or being composed of a plurality of aromatic rings which are connected to each other via a divalent hydrocarbon group, a divalent silicon-containing group, a divalent nitrogen-containing group, a divalent phosphorus-containing group, a divalent oxygen-containing group, a divalent sulfur-containing group, or carbon-carbon bond; divalent hydrophilic groups being composed of one aromatic ring, or being composed of a plurality of aromatic rings which are connected to each other via a divalent hydrocarbon group, a divalent silicon-containing group, a divalent nitrogen-containing group, a divalent phosphorus-containing group, a divalent oxygen-containing group, a divalent sulfur-containing group, or carbon-carbon bond, the aromatic ring or at least one of the aromatic rings having an anion exchange group; and a divalent fluorine-containing group having a predetermined structure; wherein the divalent hydrophobic groups are connected to each other via ether bond, thioether bond, or carbon-carbon bond to form a hydrophobic unit; wherein the divalent hydrophilic groups are connected to each other via ether bond, thioether bond, or carbon-carbon bond to form a hydrophilic unit; wherein the hydrophobic unit and the hydrophilic unit are connected via ether bond, thioether bond, or carbon-carbon bond; and wherein the divalent fluorine-containing group are connected via ether bond, thioether bond, a carbon-silicon bond, or carbon-carbon bond in the main chain of the hydrophobic unit and/or the hydrophilic unit is known (Patent Document 1).

PRIOR ART DOCUMENTS

Patent Document

Patent Document 1: JP 2016-44224 A

SUMMARY OF THE INVENTION

Problem to be Solved by the Invention

Although the anion exchange resin as described in Patent Document 1 successfully improves chemical properties (durability, in particular, alkali resistance) while maintaining high electrical properties (anion conductivity), there is a need for further improved chemical properties.

Means of Solving the Problem

Accordingly, an object of the present invention is to provide an anion exchange resin being capable of producing an electrolyte membrane, a binder for forming an electrode catalyst layer and a fuel cell electrode catalyst layer, which have improved chemical properties (durability, in particular, alkali resistance); an electrolyte membrane and a binder for forming an electrode catalyst layer produced from the anion exchange resin; a fuel cell electrode catalyst layer produced by the binder for forming the electrode catalyst layer; and a fuel cell having the electrolyte membrane or the electrode catalyst layer.

In order to solve the problem, the anion exchange resin of the present invention comprises:

a hydrophobic unit being composed of a divalent hydrophobic group alone, or being composed of a plurality of divalent hydrophobic groups repeated via ether bond, thioether bond, or carbon-carbon bond; and a hydrophilic unit being composed of a divalent hydrophilic group alone containing an anion exchange group-containing group, or being composed of a plurality of divalent hydrophilic groups containing an anion exchange group-containing group repeated via ether bond, thioether bond, or carbon-carbon bond;

wherein the anion exchange group-containing group is represented by the following formula (A) or (B); and wherein the hydrophobic unit and the hydrophilic unit are connected via ether bond, thioether bond, or carbon-carbon bond.

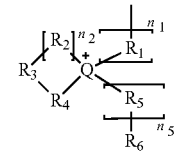

(A)

(In the formula, $R_1$, $R_2$, $R_3$, $R_4$, $R_5$, and $R_6$ are the same or different and represent carbon atom or silicon atom connected with hydrogen atom, a halogen atom, or a pseudohalide; Q represents nitrogen atom or phosphorus atom; and $n_1$, $n_2$, and $n_5$ are the same or different and represent an integer of 0 or more.)

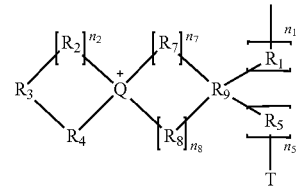

(B)

(In the formula, $R_1$, $R_2$, $R_3$, $R_4$, $R_5$, $R_7$, and $R_8$ are the same or different and represent carbon atom or silicon atom connected with hydrogen atom, a halogen atom, or a pseudohalide; $R_9$ represents carbon atom or silicon atom; Q represents nitrogen atom or phosphorus atom; T represents hydrogen atom, a halogen atom, or a pseudohalide; and $n_1$, $n_2$, $n_5$, $n_7$, and $n_8$ are the same or different and represent an integer of 0 or more.) In the anion exchange resin of the present invention, the anion exchange group-containing group is suitably represented by the following formula (A2) or (B2).

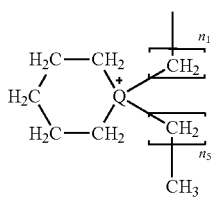
(A2)

(In the formula, Q represents nitrogen atom or phosphorus atom; and $n_1$ and $n_5$ are the same or different and represent an integer of 0 or more.)

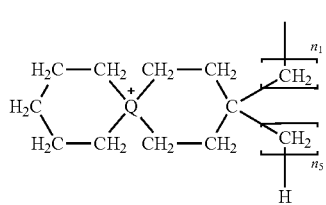
(B2)

(In the formula, Q represents nitrogen atom or phosphorus atom; and $n_1$ and $n_5$ are the same or different and represent an integer of 0 or more.)

In the anion exchange resin of the present invention, the hydrophobic group is suitably composed of one aromatic ring, or is composed of a plurality of aromatic rings which are connected to each other by a divalent hydrocarbon group, a divalent silicon-containing group, a divalent nitrogen-containing group, a divalent phosphorus-containing group, a divalent oxygen-containing group, a divalent sulfur-containing group, or carbon-carbon bond; and the hydrophilic group is suitably composed of one aromatic ring, or being composed of a plurality of aromatic rings which are connected to each other via a linking group and/or carbon-carbon bond, wherein the linking group is a divalent hydrocarbon group, a divalent silicon-containing group, a divalent nitrogen-containing group, a divalent phosphorus-containing group, a divalent oxygen-containing group, or a divalent sulfur-containing group, and at least one of the linking group or the aromatic ring is connected to the anion exchange group-containing group.

In the anion exchange resin of the present invention, the hydrophobic group suitably comprises a bisphenol residue which may be substituted with a halogen atom, a pseudohalide, an alkyl group, or an aryl group, as shown in the following formula (2).

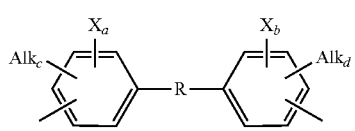
(2)

(In the formula, R represents a hydrocarbon group, a silicon-containing group, a nitrogen-containing group, a phosphorus-containing group, an oxygen-containing group, a sulfur-containing group, an aromatic group, or direct bond, each of which may be substituted with a halogen atom or a pseudohalide; each Alk is the same or different and represents an alkyl group or an aryl group; each X is the same or different and represents a halogen atom or a pseudohalide; and a, b, c, and d are the same or different and represent an integer of 0 to 4.)

In the anion exchange resin of the present invention, the hydrophobic group suitably comprises a bisphenol residue which may be substituted with a halogen atom, a pseudohalide, an alkyl group, or an aryl group, as shown in the following formula (1). In particular, in the following formula (1), Z is carbon atom; R is direct bond; X is fluorine atom; and h, h', h", i", j, and k are 0.

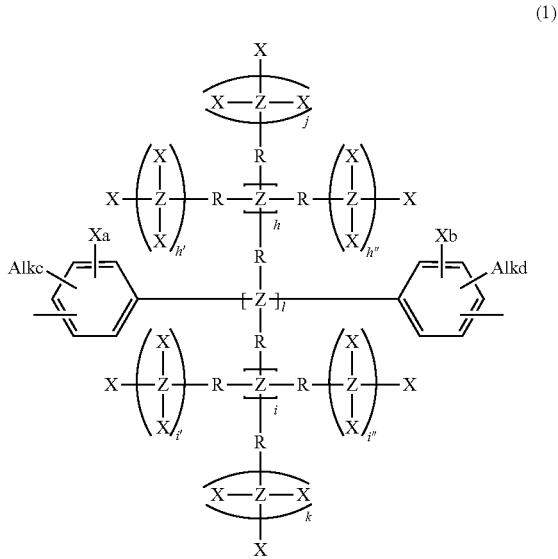
(1)

(In the formula, Alk, X, a, b, c, and d have the same meaning as Alk, X, a, b, c, and d in the formula (2); each Z is the same or different and represents carbon atom or silicon atom; each R is the same or different and represents a silicon-containing group, a nitrogen-containing group, a phosphorus-containing group, an oxygen-containing group, a sulfur-containing group, or direct bond; l represents an integer of 1 or more; h, h', h", i", j, and k are the same or different and represent an integer of 0 or more.)

In the anion exchange resin of the present invention, the hydrophilic group is suitably composed of one polycyclic compound, or is composed of a plurality of polycyclic compounds which are connected to each other via a linking group and/or carbon-carbon bond, wherein the linking group is a divalent hydrocarbon group, a divalent silicon-containing group, a divalent nitrogen-containing group, a divalent phosphorus-containing group, a divalent oxygen-containing group, or a divalent sulfur-containing group.

In the anion exchange resin of the present invention, the hydrophilic group suitably comprises a fluorene residue as shown in the following formula (3).

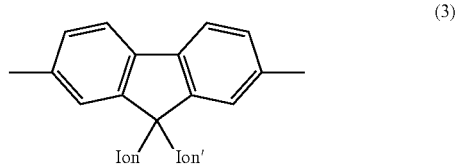

(3)

(In the formula, Ion and Ion' are the same or different and represent an anion exchange group-containing group.)

In order to solve the problem, an electrolyte membrane of the present invention comprises the anion exchange resin as described above.

In order to solve the problem, a binder for forming an electrode catalyst layer of the present invention comprises the anion exchange resin as described above.

In order to solve the problem, a fuel cell electrode catalyst layer of the present invention comprises the binder for forming an electrode catalyst layer as described above.

In order to solve the problem, a fuel cell of the present invention comprises:

an electrolyte membrane comprising the anion exchange resin as described above; and a fuel side electrode to which a hydrogen-containing fuel is supplied and an oxygen side electrode to which oxygen and air are supplied, the fuel side electrode and the oxygen side electrode being oppositely disposed by interposing the electrolyte membrane.

In the fuel cell of the present invention, the hydrogen-containing fuel is suitably hydrogen, an alcohol, or hydrazines.

In order to solve the problem, the fuel cell of the present invention comprises:

an electrolyte membrane;

a fuel side electrode to which a hydrogen-containing fuel is supplied and an oxygen side electrode to which oxygen and air are supplied, the fuel side electrode and the oxygen side electrode being oppositely disposed by interposing the electrolyte membrane; and wherein the fuel side electrode and/or the oxygen side electrode comprises the fuel cell electrode catalyst layer as described above.

In the fuel cell of the present invention, the hydrogen-containing fuel is suitably hydrogen, an alcohol, or hydrazines.

Effect of the Invention

The present invention can provide an anion exchange resin being capable of producing an electrolyte membrane, a binder for forming an electrode catalyst layer and a fuel cell electrode catalyst layer, which have improved chemical properties (durability, in particular, alkali resistance); an electrolyte membrane and a binder for forming an electrode catalyst layer produced from the anion exchange resin; a fuel cell electrode catalyst layer produced by the binder for forming the electrode catalyst layer; and a fuel cell having the electrolyte membrane or the electrode catalyst layer.

MODE FOR CARRYING OUT THE INVENTION

Figure 1:
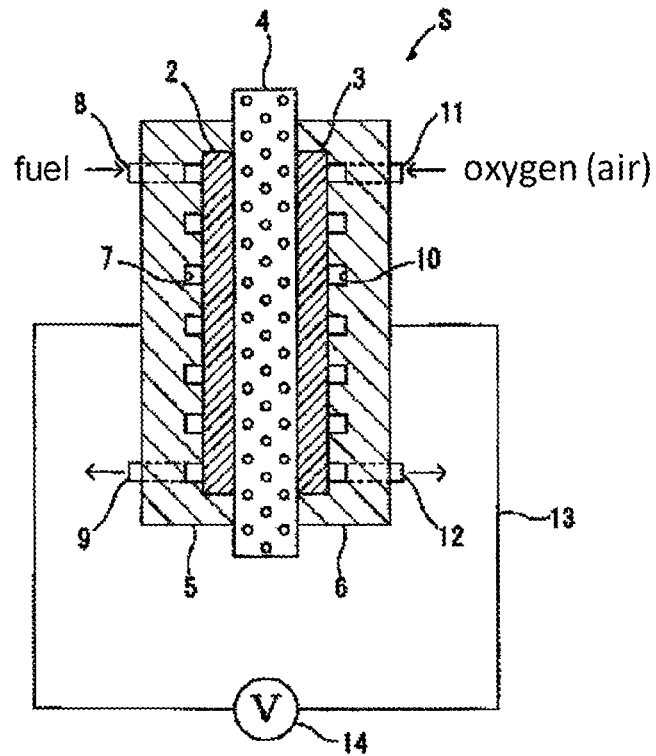
FIG. 1 is a schematic diagram showing an embodiment of the fuel cell of the present invention.

The anion exchange resin of the present invention is composed of a divalent hydrophobic group and a divalent hydrophilic group.

In the anion exchange resin of the present invention, examples of the divalent hydrophobic group include groups being composed of one aromatic ring and groups being composed of a plurality of (two or more, and preferably two) aromatic rings which are connected to each other by a divalent hydrocarbon group, a divalent silicon-containing group, a divalent nitrogen-containing group, a divalent phosphorus-containing group, a divalent oxygen-containing group, a divalent sulfur-containing group, or carbon-carbon bond.

Examples of the aromatic ring include monocyclic compounds or polycyclic compounds having carbon atoms of 6 to 14 such as benzene ring, naphthalene ring, indene ring, azulene ring, fluorene ring, anthracene ring, and phenanthrene ring; and heterocyclic compounds such as azole, oxole, thiophene, oxazole, thiazole, and pyridine.

Preferred examples of the aromatic ring include monoaromatic hydrocarbons having carbon atoms of 6 to 14, and more preferred examples of the aromatic ring include benzene ring.

The aromatic ring may be substituted with a substituent group such as a halogen atom, an alkyl group, an aryl group, or a pseudohalide, as needed. Examples of the halogen atom include fluorine atom, chlorine atom, bromine atom and iodine atom. Examples of the pseudohalide include trifluoromethyl group, —CN, —NC, —OCN, —NCO, —ONC, —SCN, —NCS, —SeCN, —NCSe, —TeCN, —NCTe, and —N$_3$. Examples of the alkyl group include alkyl groups having carbon atoms of 1 to 20 such as methyl group, ethyl group, propyl group, i-propyl group, butyl group, i-butyl group, sec-butyl group, t-butyl group, pentyl group, hexyl group, heptyl group, and octyl group; and cycloalkyl groups having carbon atoms of 1 to 20 such as cyclopropyl group, cyclobutyl group, cyclopentyl group, cyclohexyl group, cycloheptyl group, and cyclooctyl group. Examples of the aryl group include phenyl group, biphenyl group, naphtyl group, and fluorenyl group.

When the aromatic ring is substituted with a substituent group such as a halogen atom, an alkyl group, an aryl group, or a pseudohalide, the number and the position of the substituent group such as the halogen atom, the alkyl group, the aryl group, or the pseudohalide is suitably selected depending on the purpose and application.

More specific examples of the aromatic ring substituted with a halogen atom include benzene rings substituted with one to four halogen atoms (for example, benzene rings substituted with one to four fluorine atoms, benzene rings substituted with one to four chlorine atoms, benzene rings substituted with one to four bromine atoms, and benzene rings substituted with one to four iodine atoms, in which one to four halogen atoms may be all the same or different).

Examples of the divalent hydrocarbon group include divalent saturated hydrocarbon groups having carbon atoms of 1 to 20 such as methylene (—CH$_2$—), ethylene, propylene, i-propylene (—C(CH$_3$)$_2$—), butylene, i-butylene, sec-butylene, pentylene (pentene), i-pentylene, sec-pentylene, hexylene (hexamethylene), 3-methylpentene, heptylene, octylene, 2-ethylhexylene, nonylene, decylene, i-decylene, dodecylene, tetradecylene, hexadecylene, and octadecylene.

Preferred examples of the divalent hydrocarbon group include divalent saturated hydrocarbon groups having carbon atoms of 1 to 3 such as methylene (—CH$_2$—), ethylene, propylene, and i-propylene (—C(CH$_3$)$_2$—). More preferred examples of the divalent hydrocarbon group include methylene (—CH$_2$—) and isopropylene (—C(CH$_3$)$_2$—), and particularly preferred examples of the divalent hydrocarbon group include i-propylene (—C(CH$_3$)$_2$—).

The divalent hydrocarbon group may be substituted with a monovalent residue in the aromatic ring as described above.

Examples of the aromatic group include divalent residues in the aromatic ring as described above. Preferred examples of the aromatic group include m-phenylene group and fluorenyl group.

Preferred examples of the hydrophobic group include bisphenol residues (divalent hydrophobic group being composed of two benzene rings which are connected to each other via R) which may be substituted with an alkyl group, an aryl group, a halogen atom, or a pseudohalide, as shown in the following formula (2).

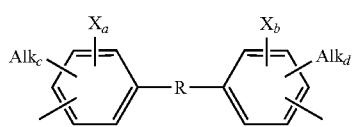

(2)

(In the formula, R represents a hydrocarbon group, a silicon-containing group, a nitrogen-containing group, a phosphorus-containing group, an oxygen-containing group, a sulfur-containing group, an aromatic group, or direct bond, each of which may be substituted with a halogen atom or a pseudohalide; each Alk is the same or different and represents an alkyl group or an aryl group; each X is the same or different and represents a halogen atom or a pseudohalide; and a, b, c, and d are the same or different and represent an integer of 0 to 4.)

In the above formula (2), R represents a hydrocarbon group, a silicon-containing group, a nitrogen-containing group, a phosphorus-containing group, an oxygen-containing group, a sulfur-containing group, an aromatic group, or direct bond, each of which may be substituted with a halogen atom or a pseudohalide, and preferably represents i-propylene(—C(CH$_3$)$_2$—).

In the above formula (2), each Alk is the same or different and represents an alkyl group or an aryl group. Examples of the alkyl group include alkyl groups as described above. Examples of the aryl group includes aryl groups as described above.

In the above formula (2), each X is the same or different and represents a halogen atom or a pseudohalide as described above.

In the above formula (2), a and b are the same or different and represent an integer of 0 to 4, and preferably represent an integer of 0 to 2. More preferably, both a and b represent 0.

In the above formula (2), c and d are the same or different and represent an integer of 0 to 4, preferably represent an integer of 0 to 2. More preferably, both c and d represent 0.

Particularly preferred examples of the hydrophobic group include bisphenol residues which may be substituted with a halogen atom, a pseudohalide, an alkyl group, or an aryl group, as shown in the following formula (1).

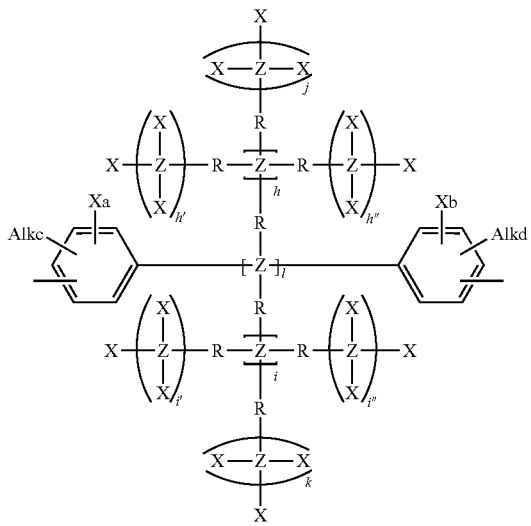

(1)

(In the formula, Alk, X, a, b, c, and d have the same meaning as Alk, X, a, b, c, and d in the formula (2); each Z is the same or different and represents carbon atom or silicon atom; each R is the same or different and represents a silicon-containing group, a nitrogen-containing group, a phosphorus-containing group, an oxygen-containing group, a sulfur-containing group, or direct bond; I represents an integer of 1 or more; h, h', h", i", j, and k are the same or different and represent an integer of 0 or more.)

In the above formula (1), each Z is the same or different and represents carbon atom or silicon atom, and preferably represents carbon atom.

In the above formula (1), each R is the same or different and represents a silicon-containing group, a nitrogen-containing group, a phosphorus-containing group, an oxygen-containing group, a sulfur-containing group, or direct bond, and preferably represents direct bond.

In the above formula (1), each X is the same or different and represents a halogen atom or a pseudohalide as described above, or hydrogen atom, preferably represents a halogen atom or hydrogen atom, and more preferably represents fluorine atom.

In the above formula (1), l represents an integer of 1 or more, preferably represents an integer of 1 to 20, and more preferably represents an integer of 2 to 6.

In the above formula (1), h, h', h", i", j, and k are the same or different and represent an integer of 0 or more, preferably represent an integer of 0 to 20, more preferably represent an integer of 0 to 3, and further preferably represent an integer of 0 or 1.

Particularly preferred examples of the hydrophobic group include fluorine-containing bisphenol residues as shown in the following formula (1') or (1").

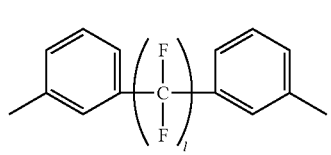

(1')

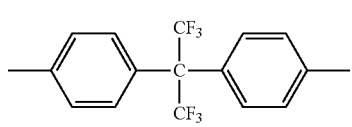
(1″)

(In the formula, I has the same meaning as I in the above formula (1).)

The introduction of the divalent fluorine-containing group in the main chain of the hydrophobic group as the component of the hydrophobic unit provides the following effects.

- The solubility and the flexibility of the resin are increased by the main chain having low intermolecular interaction.
- It can provide the water repellency of the resin, and form ion conductive paths by promoting the phase separation to a hydrophilic moiety (near the ion exchange group).
- The water repellency prevents a hydrophilic hydroxide ion and an oxidant from accessing the main chain (it provides improved alkali resistance and improved chemical stability).
- The rigidity of the main chain can be regulated (it provides improved flexibility of the electrolyte membrane.)
- The resin can adhere the catalyst layer due to its low glass transition temperature (The contact resistance is decreased.)
- The gas diffusion capability of the resin can be regulated (the oxygen diffusion capability is increased when it is used as a binder).

Preferred examples of the hydrophobic group include divalent hydrophobic groups being composed of two or more aromatic rings which are connected to each other via carbon-carbon bond, and specific examples of the hydrophobic group include linear oligophenylene groups as shown in the following formula (2a).

(2a)

(In the formula, x represents an integer of 2 to 8.)

Particularly preferred examples of the hydrophobic group include linear oligophenylene groups as shown in the following structures.

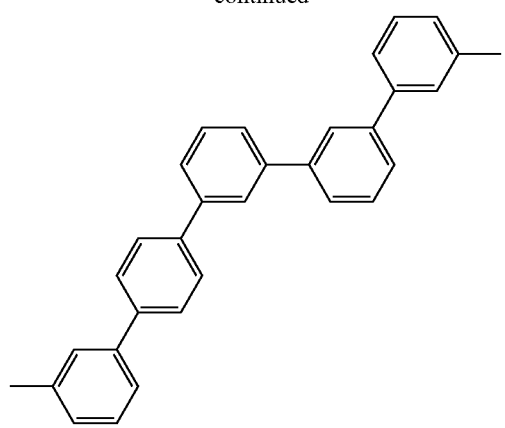

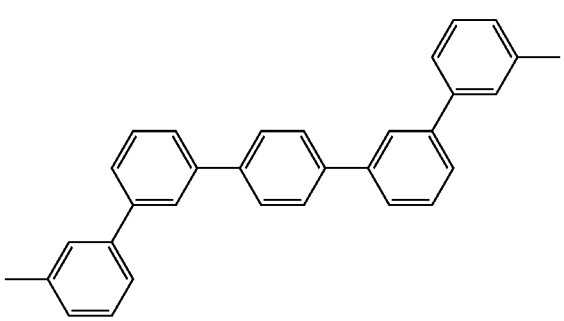

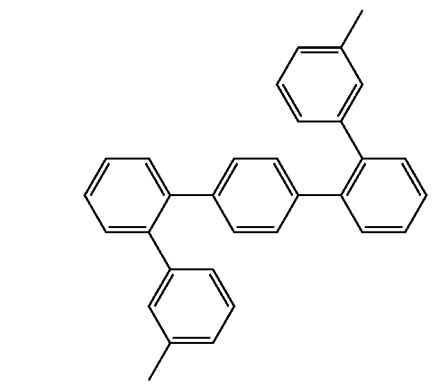

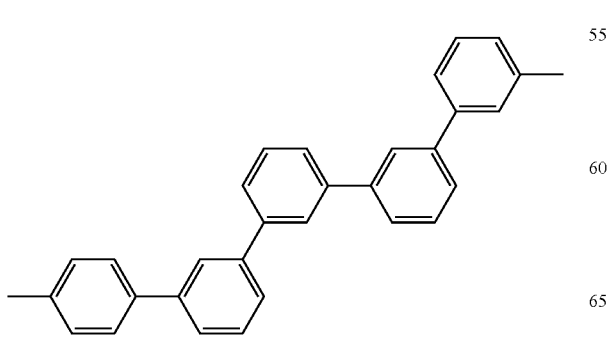

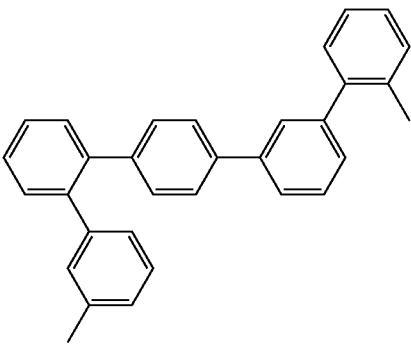

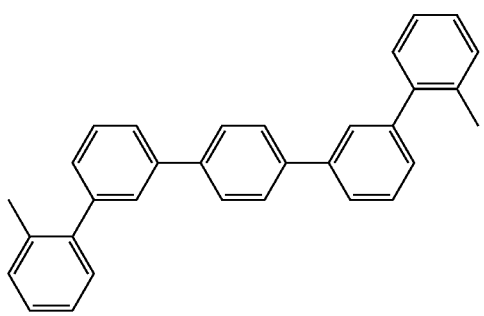 [SMILES: Cc1ccccc1-c1cccc(-c2ccc(-c3cccc(-c4ccccc4C)c3)cc2)c1]

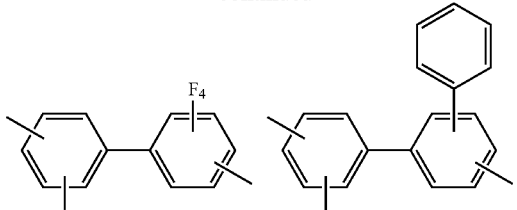

The electrical properties (conductivity) is increased by including a divalent hydrophobic group be composed of two or more aromatic rings which are connected to each other via carbon-carbon bond (preferably including a linear oligophenylene group as shown in the following formula (2a)), as the hydrophobic group. In particular, the content of water per an ion group is prevented from increasing even if the IEC (Ion Exchange Capacity) is increased. Therefore, it facilitates to accomplish higher conductivity.

In the above formula (2a), x represents an integer of 2 to 8, preferably represents an integer of 2 to 6, and more preferably represents 2 (that is, biphenylene group).

Other examples of the hydrophobic group include groups having the following structures.

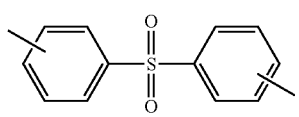

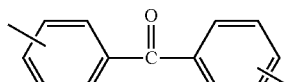

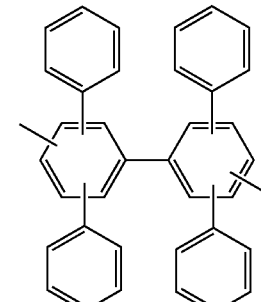

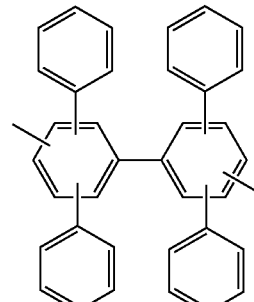

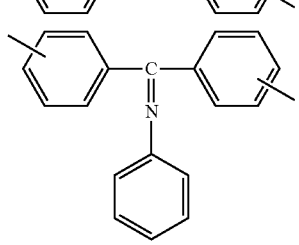

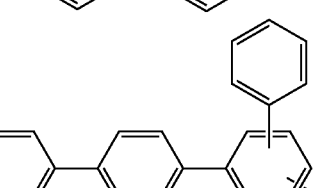

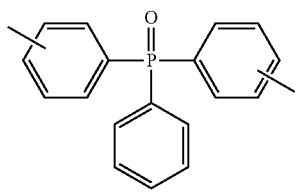

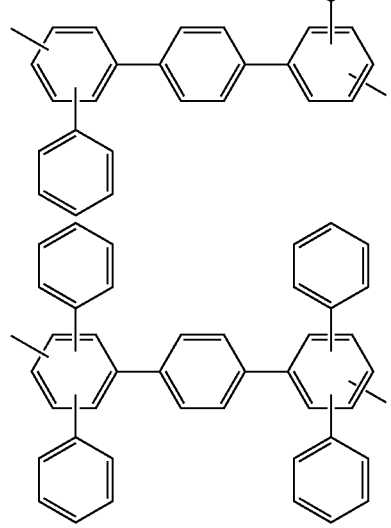

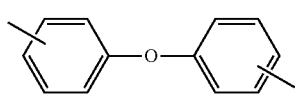

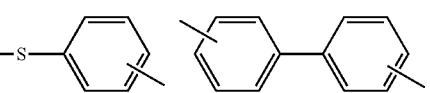

In the anion exchange resin of the present invention, examples of the divalent hydrophilic group include groups being composed of one aromatic ring and groups being composed of a plurality of aromatic rings which are connected to each other via a linking group and/or carbon-carbon bond, in which the linking group is a divalent hydrocarbon group, a divalent silicon-containing group, a divalent nitrogen-containing group, a divalent phosphorus-containing group, a divalent oxygen-containing group, or a divalent sulfur-containing group, and at least one of the linking group or the aromatic ring is connected to a specified anion exchange group-containing group.

The aromatic ring may be a monocyclic compound (benzene ring), or a polycyclic compound. Examples of the polycyclic compound include naphthalene ring, indene ring, azulene ring, fluorene ring, anthracene ring, phenanthrene ring, carbazole ring, and indole ring. Preferred examples of the polycyclic compound include fluorene ring.

Examples of the divalent hydrocarbon group include divalent hydrocarbon groups as described above.

The anion exchange group-containing group is introduced in the side chain in the hydrophilic group. Specifically, the anion exchange group-containing group is represented by the following formula (A) or (B).

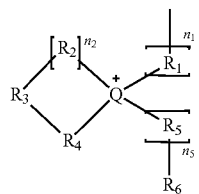
(A)

(In the formula, $R_1$, $R_2$, $R_3$, $R_4$, $R_5$, and $R_6$ are the same or different and represent carbon atom or silicon atom connected with hydrogen atom, a halogen atom, or a pseudohalide; Q represents nitrogen atom or phosphorus atom; $n_1$, $n_2$, and $n_5$ are the same or different and represent an integer of 0 or more.)

In the above formula (A), $R_1$, $R_2$, $R_3$, $R_4$, $R_5$, and $R_6$ are the same or different and represent carbon atom or silicon atom connected with hydrogen atom, a halogen atom as described above, or a pseudohalide as described above, and preferably represent methylene group (—$CH_2$—).

In the above formula (A), Q represents nitrogen atom or phosphorus atom, and preferably represents nitrogen atom.

In the above formula (A), $n_1$ represents an integer of 0 or more, preferably represents an integer of 1 to 20, more preferably represents an integer of 3 to 10, and further preferably represents an integer of 4 to 8.

In the above formula (A), $n_2$ represents an integer of 0 or more, preferably represents an integer of 2 to 10, more preferably represents an integer of 3 to 8, and further preferably represents an integer of 4 to 6.

In the above formula (A), $n_5$ represents an integer of 0 or more, preferably represents an integer of 1 to 4, and more preferably represents an integer of 1 to 2.

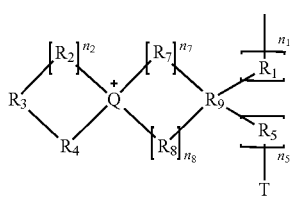
(B)

(In the formula, $R_1$, $R_2$, $R_3$, $R_4$, $R_5$, $R_7$, and $R_8$ are the same or different and represent carbon atom or silicon atom connected with hydrogen atom, a halogen atom, or a pseudohalide; $R_9$ represents carbon atom or silicon atom; Q represents nitrogen atom or phosphorus atom; T represents hydrogen atom, a halogen atom, or a pseudohalide; and $n_1$, $n_2$, $n_5$, $n_7$, and na are the same or different and represent an integer of 0 or more.)

In the above formula (B), $R_1$, $R_2$, $R_3$, $R_4$, $R_5$, $R_6$, $R_7$, and $R_8$ are the same or different and represent carbon atom or silicon atom connected with hydrogen atom, a halogen atom as described above, or a pseudohalide as described above, and preferably represent methylene group (—$CH_2$—).)

In the above formula (B), $R_9$ represents carbon atom or silicon atom, and preferably represents carbon atom.

In the above formula (B), Q represents nitrogen atom or phosphorus atom, and preferably represents nitrogen atom.

In the above formula (B), $n_1$ represents an integer of 0 or more, preferably represents an integer of 1 to 20, more preferably represents an integer of 3 to 10, and further preferably represents an integer of 4 to 8.

In the above formula (B), $n_2$ represents an integer of 0 or more, preferably represents an integer of 2 to 10, more preferably represents an integer of 3 to 8, and further preferably represents an integer of 4 to 6.

In the above formula (B), $n_5$ represents an integer of 0 or more, preferably represents an integer of 1 to 4, and more preferably represents an integer of 1 to 2.

In the above formula (B), $n_7$ represents an integer of 0 or more, preferably represents an integer of 1 to 5, more preferably represents an integer of 0 to 4, and further preferably represents an integer of 1 to 3.

In the above formula (B), $n_8$ represents an integer of 0 or more, preferably represents an integer of 1 to 5, more preferably represents an integer of 0 to 4, and further preferably represents an integer of 1 to 3.

Preferred examples of the anion exchange group-containing group include groups as shown in the following formula (A1), the following formula (A2), the following formula (A3), the following formula (B1), the following formula (B2), the following formula (B3), the following formula (B4), or the following formula (B5). More preferred examples include groups as shown in the following formula (A2) or (B2).

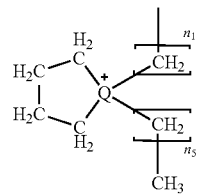
(A1)

(In the formula, Q, $n_1$, and $n_5$ have the same meaning as Q, $n_1$, and $n_5$ in the above formula (A).)

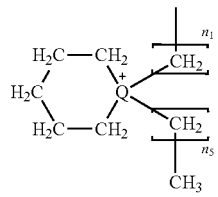
(A2)

(In the formula, Q, $n_1$, and $n_5$ have the same meaning as Q, $n_1$, and $n_5$ in the above formula (A).)

(A3)

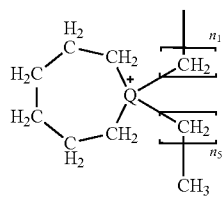

(In the formula, Q, $n_1$, and $n_5$ have the same meaning as Q, $n_1$, and $n_5$ in the above formula (A).)

(B1)

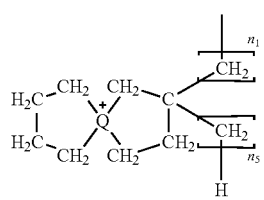

(In the formula, Q, $n_1$, and $n_5$ have the same meaning as Q, $n_1$, and $n_5$ in the above formula (B).)

(B2)

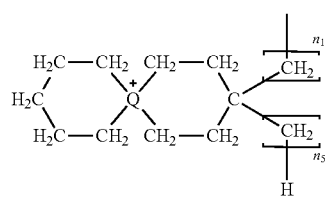

(In the formula, Q, $n_1$, and $n_5$ have the same meaning as Q, $n_1$, and $n_5$ in the above formula (B).)

(B3)

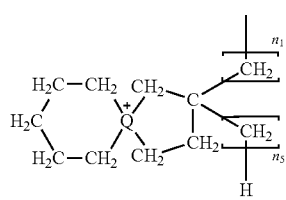

(In the formula, Q, $n_1$, and $n_5$ have the same meaning as Q, $n_1$, and $n_5$ in the above formula (B).)

(B4)

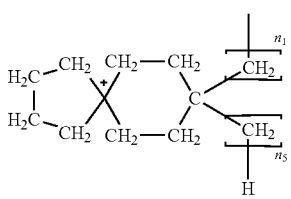

(In the formula, Q, $n_1$, and $n_5$ have the same meaning as Q, $n_1$, and $n_5$ in the above formula (B).)

(B5)

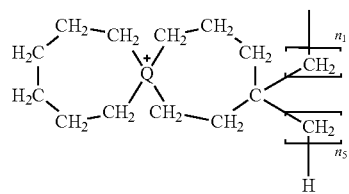

(In the formula, Q, $n_1$, and $n_5$ have the same meaning as Q, $n_1$, and $n_5$ in the above formula (B).)

Particularly preferred examples of the anion exchange group-containing group include a group in which Q is nitrogen atom, $n_1$ is 6, and $n_5$ is 0 in the above formula (A2), having the following structure.

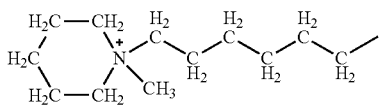

Particularly preferred examples of the anion exchange group-containing group include a group in which Q is nitrogen atom, $n_1$ is 6, and $n_5$ is 0 in the above formula (B2), having the following structure.

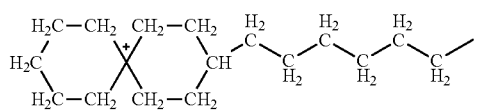

The anion exchange group-containing group is connected to at least one of the linking group or the aromatic ring. The anion exchange group-containing group may be connected to a plurality of linking groups or aromatic rings. The anion exchange group-containing group may be connected to all linking groups or aromatic rings. A plurality of anion exchange groups may be connected to one linking group or aromatic ring.

Preferred examples of the hydrophilic group include groups being composed of one polycyclic compound and groups being composed of a plurality of polycyclic compounds which are connected to each other via a linking group and/or carbon-carbon bond, in which the linking group is a divalent hydrocarbon group, a divalent silicon-containing group, a divalent nitrogen-containing group, a divalent phosphorus-containing group, a divalent oxygen-containing group, or a divalent sulfur-containing group.

Particularly preferred examples of the hydrophilic group include fluorene residues as shown in the following formula (3).

(3)

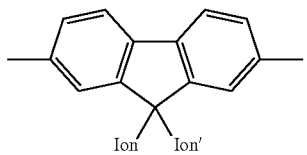

(In the formula, Ion and Ion' are the same or different and represent the anion exchange group-containing group as described above.)

Particularly preferred examples of the hydrophilic group include fluorene residues as shown in the following formula (3'), the following formula (3"), or the following formula (3''').
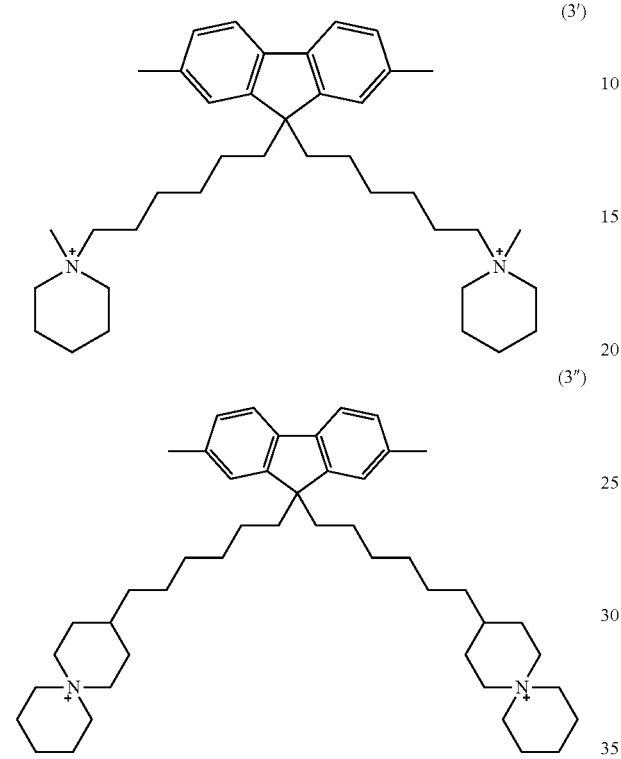
Other examples of the hydrophilic group include groups having the following structures.
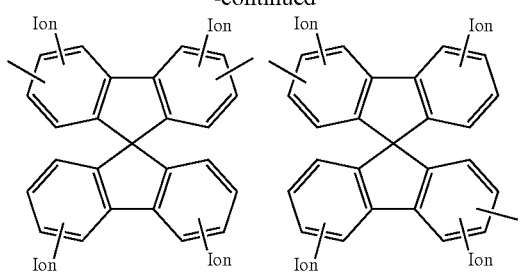
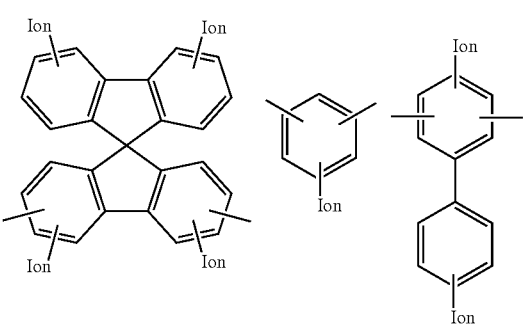
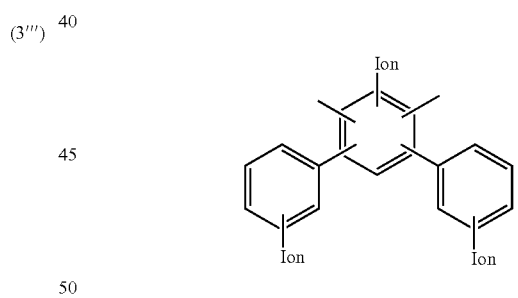
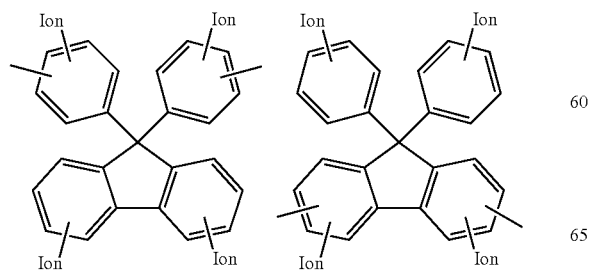
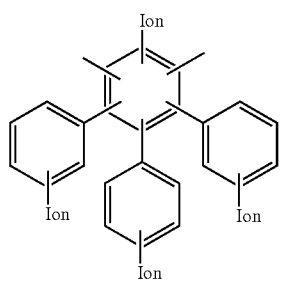

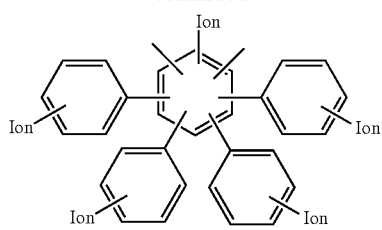

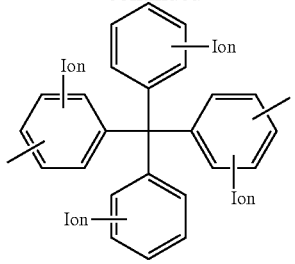

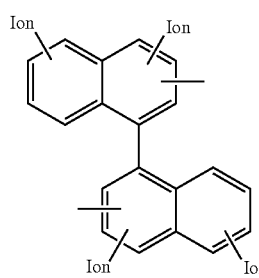 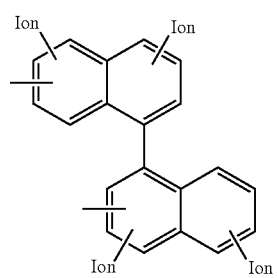

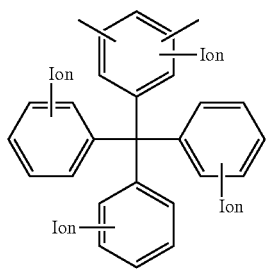

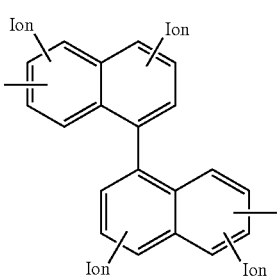

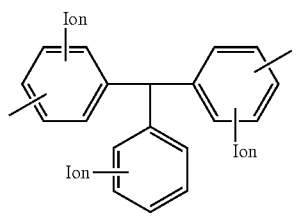

(In the formulae, each Ion is the same or different and represents an anion exchange group-containing group as described above.)

The anion exchange resin of the present invention may have a hydrophobic unit being composed of the above-described hydrophobic groups repeated via ether bond, thioether bond, or carbon-carbon bond and a hydrophilic unit being composed of the above-described hydrophilic groups repeated via ether bond, thioether bond, or carbon-carbon bond. Preferably, the hydrophobic unit is composed of a hydrophobic group alone, or is composed of hydrophobic groups repeated via carbon-carbon bond. Preferably, the hydrophilic unit is composed of a hydrophilic group alone, or is composed of hydrophilic groups repeated via carbon-carbon bond.

It is noted that the unit corresponds to a block commonly used in the block copolymer.

Preferred examples of the hydrophobic unit include units formed by connecting a bisphenol residue which may be substituted with an alkyl group, an aryl group, a halogen atom, or a pseudohalide, as shown in the above formula (2) to each other via carbon-carbon bond. The bisphenol residue may be a unit formed by connecting a plurality of types of hydrophobic groups in random, ordered including alternating, or block form.

For example, the hydrophobic unit is shown in the following formula (7).

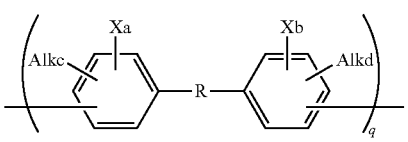

(7)

(In the formula, R, Alk, X, a, b, c, and d have the same meaning as R, Alk, X, a, b, c, and d in the above formula (2); and q represents a number of 1 to 200.)

In the above formula (7), q represents a number of 1 to 200, for example.

Preferably, q represents a number of 1 to 50.

More preferred examples of the hydrophobic unit include units formed by connecting a bisphenol residue which may be substituted with a halogen atom, a pseudohalide, an alkyl group, or an aryl group, as shown in the above formula (1) to each other via carbon-carbon bond.

For example, the hydrophobic unit is shown in the following formula (7a).

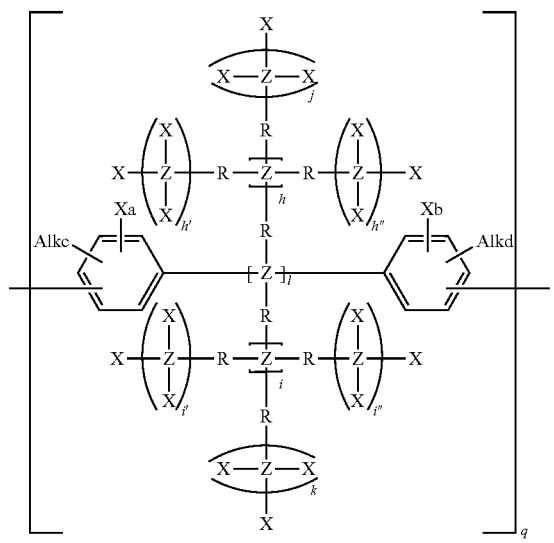

(7a)

(In the formula, Alk, X, a, b, c, and d have the same meaning as Alk, X, a, b, c, and d in the above formula (2); Z, R, X, I, h, h', h", i", j, and k have the same meaning as Z, R, X, I, h, h', h", i", j and k in the above formula (1); and q represents a number of 1 to 200.)

In the above formula (7), q represents a number of 1 to 200, for example. Preferably, q represents a number of 1 to 50.

Particularly preferably, the hydrophobic unit is shown in the following formula (7a').

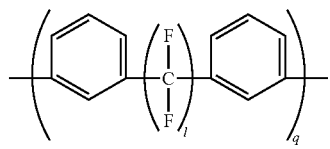

(7a')

(In the formula, I has the same meaning as I in the above formula (1); and q represents a number of 1 to 200 (preferably, 1 to 50).)

Preferred examples of the hydrophilic unit include unit formed by connecting a fluorene residue as shown in the above formula (3) (the hydrophilic group) to each other via ether bond, thioether bond, or carbon-carbon bond (preferably, carbon-carbon bond). The fluorene residue may be a unit formed by connecting a plurality of types of hydrophilic groups in random, ordered including alternating, or block form.

For example, the hydrophilic unit is shown in the following formula (9).

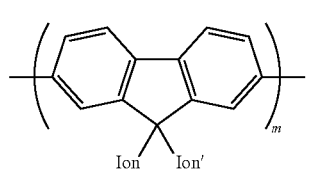

(9)

(In the formula, Ion and Ion' are the same or different and have the same meaning as Ion and Ion' in the above formula (3); and m represents a number of 1 to 200 (preferably 1 to 50).)

Particularly preferred examples of the hydrophilic unit include units formed by connecting a fluorene residue as shown in the above formula (3') to each other via carbon-carbon bond.

For example, the hydrophilic unit is shown in the following formula (9').

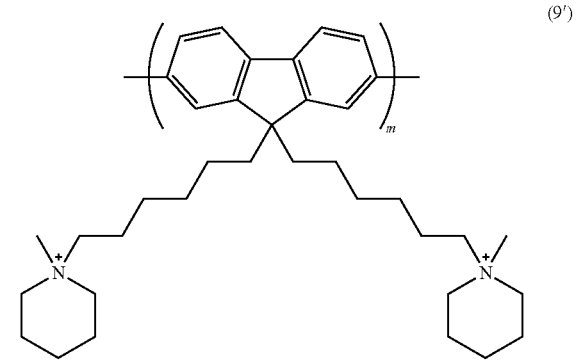

(9')

(In the formula, m represents a number of 1 to 200 (preferably, 1 to 50).)

In the anion exchange resin of the present invention, the hydrophobic unit as described above and the hydrophilic unit as described above are connected via ether bond, thioether bond, or carbon-carbon bond. Preferably, the hydrophobic unit as described above and the hydrophilic unit as described above are connected via carbon-carbon bond.

Preferred examples of the anion exchange resin include anion exchange resins formed by connecting a hydrophobic unit as shown in the above formula (7) and a hydrophilic unit as shown in the above formula (9) via carbon-carbon bond, as shown in the following formula (13).

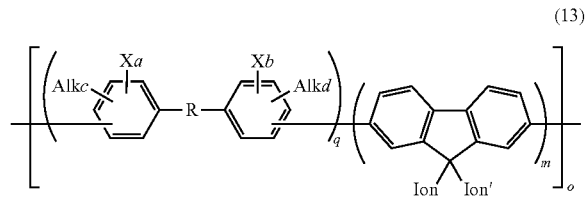

(13)

(In the formula, R, Alk, X, a, b, c, and d have the same meaning as R, Alk, X, a, b, c, and d in the above formula (7); Ion and Ion' have the same meaning as Ion and Ion' in the above formula (9); q and m represent the blending ratio or the repeating number and represent a number of 1 to 200; and o represents the repeating number and represents a number of 1 to 100.)

More preferred examples of the anion exchange resin include anion exchange resins formed by connecting a hydrophobic unit as shown in the above formula (7a) and a hydrophilic unit as shown in the above formula (9) via carbon-carbon bond, as shown in the following formula (13').

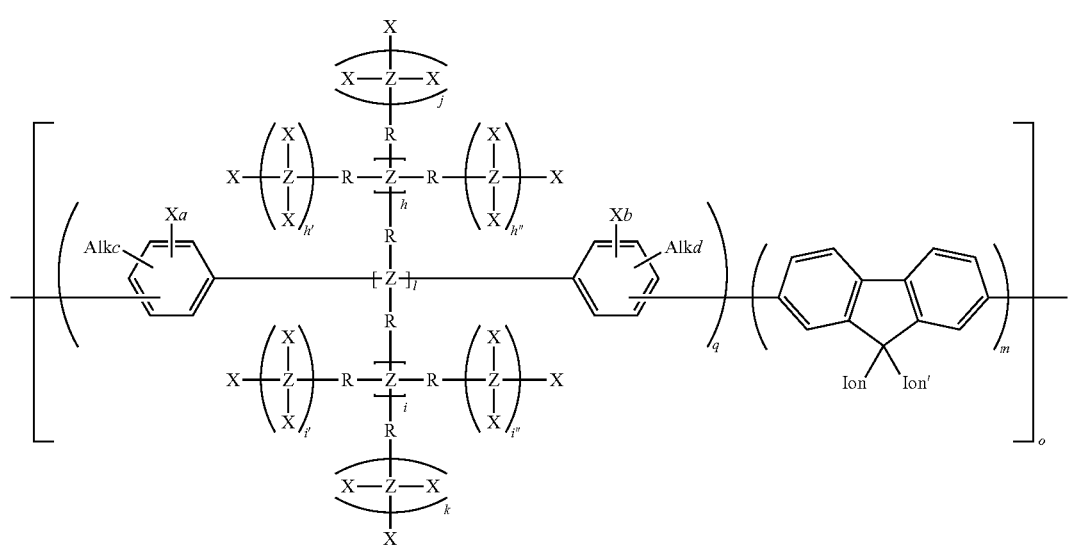

(13')

(In the formula, Alk, X, a, b, c, and d have the same meaning as Alk, X, a, b, c, and d in the above formula (2); Z, R, X, I, h, h', h", i", j, and k have the same meaning as Z, R, X, I, h, h', h", i", j, and k in the above formula (1); Ion and Ion' have the same meaning as Ion and Ion' in the above formula (9); q and m represent the blending ratio or the repeating number and represent a number of 1 to 200; and o represents the repeating number and represents a number of 1 to 100.)

Particularly preferred examples of the anion exchange resin include anion exchange resins formed by connecting a hydrophobic unit as shown in the above formula (7a') and a hydrophilic unit as shown in the above formula (9') via carbon-carbon bond, as shown in the following formula (13").

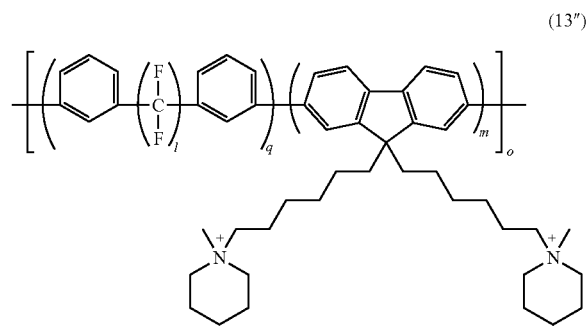

(13")

(In the formula, I has the same meaning as I in the above formula (7a'); q and m represent the blending ratio or the repeating number and represent a number of 1 to 200; and o represents the repeating number and represents a number of 1 to 100.)

As described above, the number average molecular weight of the anion exchange resin is, for example, from 10 to 1000 kDa, and preferably from 30 to 500 kDa.

The method for producing the anion exchange resin is not particularly limited, and any method known in the art can be used. Preferably, the method by polycondensation reaction is used.

When the anion exchange resin is produced by the method, for example, the anion exchange resin can be produced by preparing a monomer for forming a hydrophilic group, by preparing a monomer for forming a hydrophilic group having a precursor functional group for an anion exchange group-containing group, by polymerizing the monomer for forming a hydrophobic group and the monomer for forming a hydrophilic group having a precursor functional group for an anion exchange group-containing group to form a polymer, and by ionizing the precursor functional group for an anion exchange group-containing group in the polymer. Alternatively, the anion exchange resin can be produced by preparing a monomer for forming a hydrophobic group, by preparing a monomer for forming a hydrophilic group, by polymerizing the monomer for forming a hydrophobic group and the monomer for forming a hydrophilic group to form a polymer, and by introducing a substituent group having an anion exchange group-containing group to the polymer.

For polycondensation reaction, any conventional known method can be used. Preferably, the cross-coupling for forming carbon-carbon bond is used.

Preferred examples of the monomer for forming a hydrophobic group include compounds as shown in the following formula (22), which correspond to the above formula (2).

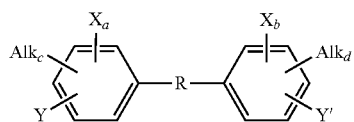

(22)

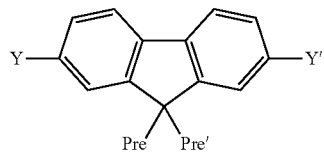

(23)

(In the formula, Alk, R, X, a, b, c, and d have the same meaning as Alk, R, X, a, b, c, and d in the above formula (2); Y and Y' are the same or different and represent a halogen atom, a pseudohalide, boronic acid group, a boronic acid derivative, or a hydrogen atom.)

Particularly preferred examples of the monomer for forming a hydrophobic group include compounds as shown in the following formula (21), which correspond to the above formula (1).

(In the formula, each Pre is the same or different and represents a precursor functional group for an anion exchange group-containing group; and Y and Y' are the same or different and represent a halogen atom, a pseudohalide, boronic acid group, a boronic acid derivative, or hydrogen atom.)

When the monomer for forming a hydrophobic group and a monomer for forming a hydrophilic group having a precursor functional group for an anion exchange group-containing group are polymerized by the cross-coupling, the blended amount of the first monomer and the second monomer is adjusted so that the desired blending ratio of the hydrophobic unit and the hydrophilic unit is obtained in the resulting precursor polymer for the anion exchange resin.

In these method, any known method may be used, including a method for dissolving a monomer for forming a hydrophobic group and a monomer for forming a hydrophilic group having a precursor functional group for an anion exchange group-containing group in a solvent such as N,N-dimethylacetamide or dimethyl sulfoxide and by polymerizing these monomers in the presence of bis(cycloocta-1,5-diene)nickel(0) as a catalyst.

The reaction temperature in the cross-coupling reaction is, for example, from −100 to 300° C., and is preferably from −50 to 200° C. The reaction time is, for example, from 1 to 48 hours, and is preferably from 2 to 5 hours.

By this reaction, precursor polymers for the anion exchange resin as shown in the following formula (15) and the following formula (16) are obtained.

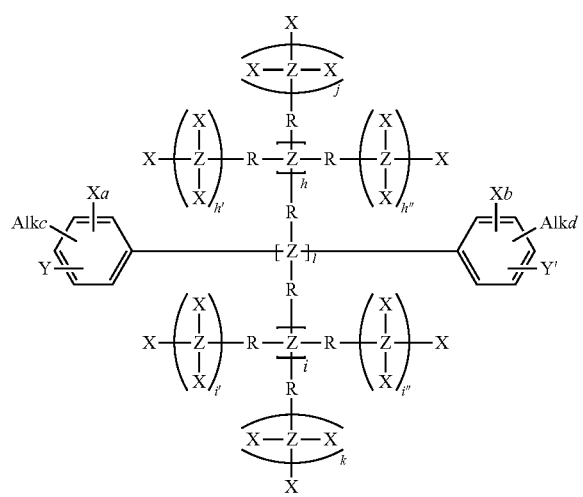

(21)

(In the formula, Alk, R, X, Z, a, b, c, d, I, h, h', h", i", j, and k have the same meaning as Alk, R, X, Z, a, b, c, d, I, h, h', h", i", j, and k in the above formula (1); Y and Y' are the same or different and represent a halogen atom, a pseudohalide, boronic acid group, a boronic acid derivative, or a hydrogen atom.)

Preferred examples of the monomer for forming a hydrophilic group having a precursor functional group for an anion exchange group-containing group include compounds as shown in the following formula (23), which correspond to the above formula (3).

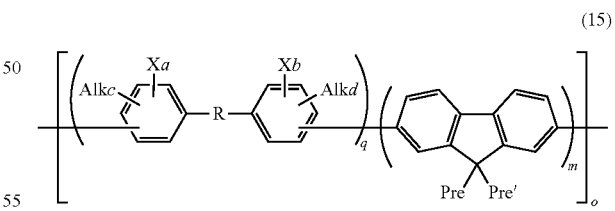

(15)

(In the formula, Alk, R, X, a, b, c, and have the same meaning as Alk, R, X, a, b, c, and d in the above formula (1); each Pre is the same or different and represents a precursor functional group for the anion exchange group-containing group; q and m represent the blending ratio or the repeating number and represent a number of 1 to 200; and o represents the repeating number and represents a number of 1 to 100.)

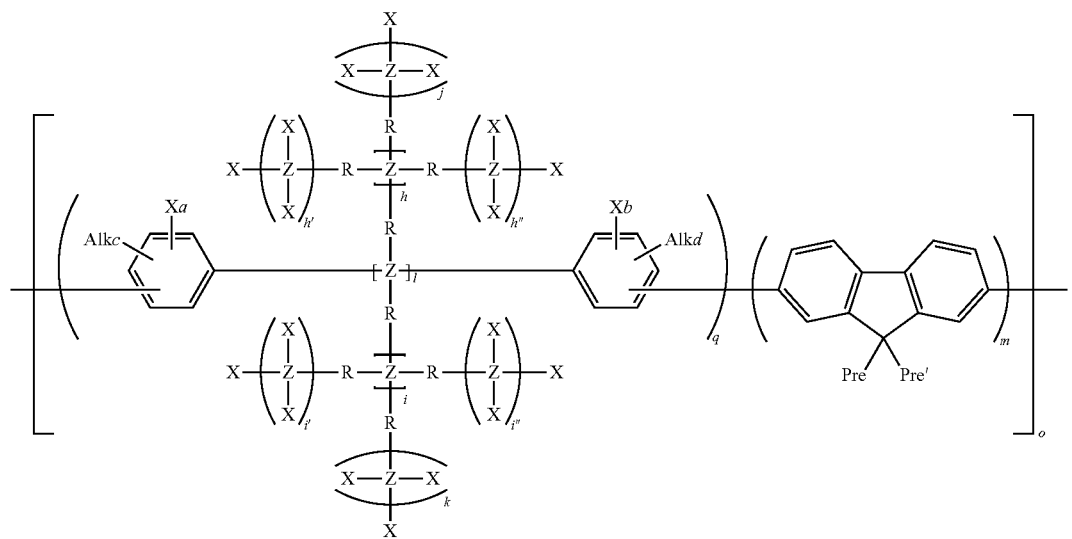

(In the formula, Alk, R, X, Z, a, b, c, d, I, h, h', h", i", j, and k have the same meaning as Alk, R, X, Z, a, b, c, d, I, h, h', h", i", j, and k in the above formula (1); each Pre is the same or different and represents a precursor functional group for the anion exchange group-containing group; q and m represent the blending ratio or the repeating number and represent a number of 1 to 200; and o represents the repeating number and represents a number of 1 to 100.)

In this method, the precursor functional group for the anion exchange group-containing group is then ionized. The method for the ionization is not particularly limited, and any method known in the art can be used.

Any method known in the art can be used, including a method for dissolving a precursor polymer for an anion exchange resin in a solvent such as N,N-dimethylacetamide or dimethyl sulfoxide and by ionizing the precursor polymer with an alkylating agent such as methyl iodide.

The reaction temperature in the ionization reaction is, for example, from 0 to 100° C., and is preferably from 20 to 80° C. The reaction time is, for example, from 24 to 72 hours, and is preferably from 48 to 72 hours.

By this reaction, anion exchange resins as shown in the above formula (13) and the above formula (13') are obtained.

The ion exchange capacity of the anion exchange resin is, for example, from 0.1 to 4.0 meq./g, and preferably from 0.6 to 3.0 meq./g.

The ion exchange capacity can be calculated by the following equation (24).

[ion exchange capacity (meq./g)]=the amount of the ion exchange group introduced per hydrophilic unit×the repeating number of the hydrophilic unit×1000/(the molecular weight of the hydrophobic unit×the repeating number of the hydrophobic unit+the molecular weight of the hydrophilic unit×the repeating number of the hydrophilic unit+the molecular weight of the ion exchange group×the repeating number of the hydrophilic unit) (24)

The amount of the ion exchange group introduced is defined as the number of the ion exchange group per unit of the hydrophilic group. The amount of the anion exchange group introduced is the mole number (mol) of the ion exchange group introduced in the main chain or the side chain of the hydrophilic group.

The anion exchange resin comprises a hydrophobic unit being composed of a divalent hydrophobic group alone, or being composed of a plurality of divalent hydrophobic groups repeated via ether bond, thioether bond, or carbon-carbon bond; and a hydrophilic unit being composed of a divalent hydrophilic group alone containing an anion exchange group-containing group, or being composed of a plurality of divalent hydrophilic groups containing an anion exchange group-containing group repeated via ether bond, thioether bond, or carbon-carbon bond; wherein the anion exchange group-containing group is represented by the above-described formula (A) or (B); and wherein the hydrophobic unit and the hydrophilic unit are connected via ether bond, thioether bond, or carbon-carbon bond. Therefore, the anion exchange resin has improved chemical properties (durability, in particular, alkali resistance) because the hydrophilic group containing a specified anion exchange group-containing group is introduced in the anion exchange resin.

In particular, if the resin has a hydrophilic unit being composed of hydrophilic groups repeated via carbon-carbon bond, the resin does not have ether bond, and therefore the resin has improved durability such as alkali resistance. More specifically, if the hydrophilic unit has ether bond, the decomposition by hydroxide ion (OH—) as described below may occur, and the anion exchange resin may have insufficient alkali resistance.

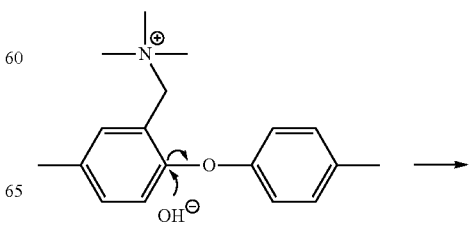

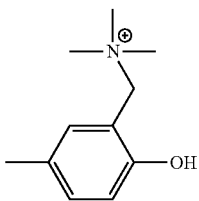

In contrast, since the hydrophilic unit of the anion exchange resin having a hydrophilic unit being composed of the hydrophilic groups repeated via carbon-carbon bond does not have an ether bond, the decomposition by the mechanism as described above does not occur, and therefore the anion exchange resin has an improved durability such as alkali resistance.

The present invention includes an electrolyte layer (an electrolyte membrane) obtained by using the anion exchange resin, and a fuel cell having the electrolyte layer (the electrolyte membrane). That is, the electrolyte membrane of the present invention is preferably an electrolyte membrane for a fuel cell.

FIG. 1 is a schematic diagram showing an embodiment of the fuel cell of the present invention. In FIG. 1, this fuel cell 1 has a cell S for the fuel cell. The cell S for the fuel cell has a fuel side electrode 2, an oxygen side electrode 3, and an electrolyte membrane 4. The fuel side electrode 2 and the oxygen side electrode 3 are oppositely disposed by interposing the electrolyte membrane 4 between them.

As the electrolyte membrane 4, the anion exchange resin as described above can be used (That is, the electrolyte membrane 4 includes the anion exchange resin as described above).

The electrolyte membrane 4 may be reinforced with a reinforcing material known in the art, for example, a porous substrate. Further, the electrolyte membrane 4 may be processed by various procedures including biaxially orientation procedure for controlling the molecular orientation, heat procedure for controlling the crystallinity and the residual stress. A filler known in the art can be added to the electrolyte membrane 4 in order to improve the mechanical strength of the electrolyte membrane 4. The electrolyte membrane 4 and a reinforcing material such as glass unwoven fabric may be pressed to form the complex.

A commonly-used various additive, for example, a compatibilizing agent for improving the compatibility, an antioxidant for preventing the degradation of the resin, and an antistatic agent or a lubricant for improving the handling in forming into the film can be suitably included in the electrolyte membrane 4, as long as the additive does not have an effect on the processability and properties of the electrolyte membrane 4.

The thickness of the electrolyte membrane 4 is not particularly limited, and is suitably selected depending on the purpose and application.

The thickness of the electrolyte membrane 4 is, for example, from 1.2 to 350 μm, and preferably from 5 to 200 μm.

The fuel side electrode 2 is contacted with one surface of the electrolyte membrane 4 so as to be disposed oppositely. For example, the fuel side electrode 2 has the catalyst layer (the fuel cell electrode catalyst layer) in which a catalyst is supported on a porous carrier.

The porous carrier is not particularly limited, and example of the porous carrier includes a water-repellent carrier such as carbon.

The catalyst of the electrode is not particularly limited, and examples of the catalyst include group 8-10 elements in periodic table (according to IUPAC Periodic Table of the Elements (version date 19 Feb. 2010); the same shall apply hereinafter) such as, for example, platinum group elements (Ru, Rh, Pd, Os, Ir, and Pt), and iron group elements (Fe, Co, and Ni); or group 11 elements in periodic table such as, for example, Cu, Ag, and Au, and combination thereof. Preferred examples of the catalyst include Pt (platinum).

For the fuel side electrode 2, for example, the porous carrier and the catalyst are dispersed in an electrolyte solution known in the art to prepare an ink for an electrode. Optionally, the viscosity of the ink for the electrode is adjusted by blending with a suitable amount of an organic solvent such as alcohols, and the ink for the electrode is applied to one surface of the electrolyte membrane 4 by any method known in the art (for example, spraying method or die coater method), and dried at a determined temperature to produce the fuel side electrode 2 as the thin electrode membrane attached to the surface of the electrolyte membrane 4.

The amount of the catalyst for the electrode supported on the fuel side electrode 2 is not particularly limited, and the amount is, for example, from 0.1 to 10.0 mg/cm$^2$, and preferably from 0.5 to 5.0 mg/cm$^2$.

In the fuel side electrode 2, a fuel to be supplied is reacted with a hydroxide ion (OH—) passed through the electrolyte membrane 4 to form an electron (e$^-$) and water ($H_2O$), as described below. For example, when the fuel is hydrogen ($H_2$), only an electron (e$^-$) and water ($H_2O$) are formed. When the fuel is alcohols, an electron (e$^-$), water ($H_2O$), and carbon dioxide ($CO_2$) are formed. When the fuel is hydrazine ($NH_2NH_2$), an electron (e$^-$), water ($H_2O$), and nitrogen ($N_2$) are formed.

The oxygen side electrode 3 is contacted with the other surface of the electrolyte membrane 4 so as to be disposed oppositely. For example, the oxygen side electrode 3 has the catalyst layer (the fuel cell electrode catalyst layer) in which a catalyst is supported on a porous carrier.

For the oxygen side electrode 3, for example, the porous carrier and the catalyst are dispersed in an electrolyte solution known in the art to prepare an ink for the electrode. Optionally, the viscosity of the ink for the electrode is adjusted by blending with a suitable amount of an organic solvent such as alcohols, and the ink for the electrode is applied to the other surface of the electrolyte membrane 4 by any method known in the art (for example, spraying method or die coater method), and dried at a determined temperature to produce the oxygen side electrode 3 as the thin electrode membrane attached to the other surface of the electrolyte membrane 4.

Therefore, the electrolyte membrane 4, the fuel side electrode 2, and the oxygen side electrode 3 form a membrane-electrode assembly by attaching the fuel side electrode 2 in the form of thin membrane to the one surface of the electrolyte membrane 4, and attaching the oxygen side electrode 3 in the form of thin membrane to the other surface of the electrolyte membrane 4.

The amount of the catalyst for the electrode supported on the oxygen side electrode 3 is not particularly limited, and the amount is, for example, from 0.1 to 10.0 mg/cm$^2$, and preferably from 0.5 to 5.0 mg/cm$^2$.

In the oxygen side electrode 3, oxygen ($O_2$) to be supplied, water ($H_2O$) passed through the electrolyte membrane 4, and an electron (e$^-$) passed through an external circuit 13 are reacted to form a hydroxide ion (OH—), as described below.

The cell S for the fuel cell further has a fuel supplying member 5 and an oxygen supplying member 6. The fuel supplying member 5 is composed of a gas impermeable conductive member, and one surface of the fuel supplying member 5 is contacted with the fuel side electrode 2 so as to be disposed oppositely. A fuel side path 7 for contacting the fuel with the whole of the fuel side electrode 2 is formed as a winding groove on one surface of the fuel supplying member 5. A supply inlet 8 and an outlet 9 are perforating through the fuel supplying member 5, and the supply inlet 8 and the outlet 9 are continuously formed on the upstream side edge and the downstream side edge of the fuel side path 7, respectively.

The oxygen supplying member 6 is also composed of a gas impermeable conductive member like the fuel supplying member 5, and one surface of the oxygen supplying member 6 is contacted with the oxygen side electrode 3 so as to be disposed oppositely. An oxygen side path 10 for contacting oxygen (air) with the whole of the oxygen side electrode 3 is also formed as a winding groove on one surface of the oxygen supplying member 6. A supply inlet 11 and an outlet 12 are perforating through the oxygen supplying member 6, and the supply inlet 11 and the outlet 12 are continuously formed on the upstream side edge and the downstream side edge of the oxygen side path 10, respectively.

This fuel cell 1 is actually formed as a stack structure in which a plurality of cells S for the fuel cell as described above is layered. Therefore, the fuel supplying member 5 and the oxygen supplying member 6 are actually formed as a separator, and the fuel side path 7 and the oxygen side path 10 are formed on both surfaces of the members.

The fuel cell 1 has a current collector being formed by a conductive member, not shown in the drawings. The electromotive force generated from the fuel cell 1 can be transmitted outwardly through terminals on the current collector.

In FIG. 1, the fuel supplying member 5 and the oxygen supplying member 6 of the cell S for the fuel cell are connected via the external circuit 13, and a voltmeter 14 is disposed in the external circuit 13 to measure the generated voltage.

In the fuel cell 1, the fuel is supplied to the fuel side electrode 2 directly without the reforming process, or after the reforming process.

Examples of the fuel include a hydrogen-containing fuel.

The hydrogen-containing fuel is a fuel having hydrogen atom in the molecule. Examples of the hydrogen-containing fuel include hydrogen gas, alcohols, and hydrazines. Preferred examples of the hydrogen-containing fuel include hydrogen gas and hydrazines.

Specific examples of hydrazines include hydrazine ($NH_2NH_2$), hydrated hydrazine ($NH_2NH_2 \cdot H_2O$), hydrazine carbonate (($NH_2NH_2)_2CO_2$), hydrazine hydrochloride ($NH_2NH_2 \cdot HCl$), hydrazine sulfate ($NH_2NH_2 \cdot H_2SO_4$), monomethylhydrazine ($CH_3NHNH_2$), dimethylhydrazine (($CH_3)_2NNH_2$, $CH_3NHNHCH_3$), and carbonhydrazide (($NHNH_2)_2CO$). The listed fuel may be used alone or in combination with two or more kinds.

Among these fuel compounds, carbon-free compounds, i.e., hydrazine, hydrated hydrazine, and hydrazine sulfate do not generate CO and $CO_2$, and do not occur the catalyst poisoning. Therefore, the compounds have an improved durability, and zero-emission can be substantially accomplished.

Although the listed fuel may be used as it is, the listed fuel compound can be used as a solution in water and/or an alcohol (for example, a lower alcohol such as methanol, ethanol, propanol, or i-propanol). In this case, the concentration of the fuel compound in the solution varies depending on the type of the fuel compound but is, for example, from 1 to 90 mass %, and is preferably from 1 to 30 mass %. The listed solvent may be used alone or in combination with two or more kinds.

Additionally, the fuel compound as described above can be used in the form of gas (for example, steam).

By supplying the fuel to the fuel side path 7 of the fuel supplying member 5 while supplying oxygen (air) to the oxygen side path 10 of the oxygen supplying member 6, on the oxygen side electrode 3, an electron ($e^-$) generated in the fuel side electrode 2 and passed through the external circuit 13, water ($H_2O$) generated in the fuel side electrode 2, and oxygen ($O_2$) are reacted to form a hydroxide ion (OH—), as described below. The formed hydroxide ion (OH—) is moved from the oxygen side electrode 3 to the fuel side electrode 2 in the electrolyte membrane 4 being composed of the anion exchange membrane. On the fuel side electrode 2, a hydroxide ion (OH—) passed through the electrolyte membrane 4 and the fuel are reacted to form an electron ($e^-$) and water ($H_2O$). The formed electron ($e^-$) is moved from the fuel supplying member 5 to the oxygen supplying member 6 via the external circuit 13, and supplied to the oxygen side electrode 3. The formed water ($H_2O$) is moved from the fuel side electrode 2 to the oxygen side electrode 3 in the electrolyte membrane 4. The electromotive force was generated by electrochemical reaction on the fuel side electrode 2 and the oxygen side electrode 3 to produce electricity.

Although the operating condition of the fuel cell 1 is not particularly limited, for example, the condition in which the applied pressure on the fuel side electrode 2 is 200 kPa or less, and preferably 100 kPa or less, the applied pressure on the oxygen side electrode 3 is 200 kPa or less, and preferably 100 kPa or less, and the temperature of the cell S for the fuel cell is from 0 to 120° C., and preferably from 20 to 80° C. is selected.

In the fuel cell 1, the electrolyte membrane for a fuel cell having the anion exchange resin having an improved durability as described above is used in the electrolyte membrane 4.

Therefore, the electrolyte membrane for a fuel cell of the present invention obtained by using the anion exchange resin of the present invention, and the fuel cell having the electrolyte membrane for a fuel cell have an improved durability.

The present invention also includes a binder for forming an electrode catalyst layer having an anion exchange resin as described above, an electrode catalyst layer for a fuel cell having the binder for forming an electrode catalyst layer, and the fuel cell having the electrolyte layer for a fuel cell.

Thus, in the fuel cell 1, the anion exchange resin can be included in the binder for forming the electrode catalyst layer during the formation of the fuel side electrode 2 and/or the oxygen side electrode 3.

Specifically, as the method for including the anion exchange resin in the binder for forming an electrode catalyst layer, for example, the binder for forming an electrode catalyst layer is prepared by cutting the anion exchange resin into pieces, and then dissolving the resin in a suitable amount of an organic solvent such as alcohols.

In the binder for forming the electrode catalyst layer, the amount of the anion exchange resin is, for example, from 2 to 10 parts by mass, and preferably from 2 to 5 parts by mass with respect to 100 parts by mass of the binder for forming the electrode catalyst layer.

By using the binder for forming an electrode catalyst layer for the formation of the catalyst layer (the fuel cell electrode catalyst layer) of the fuel side electrode 2 and/or the oxygen side electrode 3, the catalyst layer (the fuel cell electrode catalyst layer) can have the anion exchange resin. Therefore, the fuel cell 1 having the catalyst layer (the fuel cell electrode catalyst layer) including the anion exchange resin can be obtained.

In the fuel cell 1, the binder for forming the electrode catalyst layer including the anion exchange resin having an improve durability as described above is used for the formation of the fuel cell electrode catalyst layer.

Therefore, the binder for forming the electrode catalyst layer of the present invention obtained by using the anion exchange resin of the present invention, and the fuel cell electrode catalyst layer obtained by using the binder for forming the electrode catalyst layer have an improved durability and an improved anion conductivity.

As a result, the fuel cell having the fuel cell electrode catalyst layer has an improved durability and an improved anion conductivity.

Although exemplary embodiments of the present invention have been described hereinabove, the embodiments of the present invention are not limited to these embodiments, but may be suitably modified by those skilled in the art without departing from the scope of the invention.

Exemplary applications of the fuel cell of the present invention include power supplies of drive motors for automobiles, marine vessels, or aircrafts; and power supplies for communication terminals including mobile phones.

EXAMPLE

Although the present invention is described based on the Example and the Comparative Example, the present invention is not limited to the following Example.

Example: Synthesis of Anion Exchange Resin QPAF-4 (Pip)

<Synthesis of Monomer 1>

To a 100 mL three-necked round-shaped flask equipped with a nitrogen inlet and a condenser were added 1,6-diiodoperfluorohexane (5.54 g, 10.0 mmol), 3-chloroiodobenzene (11.9 g, 50 mmol), and dimethyl sulfoxide (60 mL). After the mixture was stirred to form a homogeneous solution, copper powder (9.53 g, 150 mmol) was added, and the reaction was carried out at 120° C. for 48 hours. The reaction was quenched by adding the reaction solution dropwise to 0.1 M aqueous nitric acid solution. The mixture was filtered to collect the precipitate. The precipitate was washed with methanol, and then the filtrate was collected. After the similar procedure was repeated, a white solid was precipitated by adding pure water to the combined filtrate. The white solid was filtered and collected, was washed with a mixed solution (pure water/methanol=1:1), and was then dried under vacuum overnight (60° C.) to obtain a monomer 1 (white solid) as shown in the following formula in a yield of 84%.

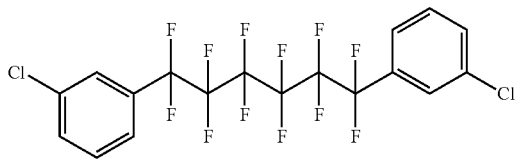 [SMILES: FC(F)(c1cccc(Cl)c1)C(F)(F)C(F)(F)C(F)(F)C(F)(F)C(F)(F)c1cccc(Cl)c1]

<Synthesis of Monomer 2>

To a 500 mL three-necked round-shaped flask were added fluorene (83.1 g, 0.50 mol), N-chlorosuccinimide (167 g, 1.25 mol), and acetonitrile (166 mL). After the mixture was stirred to form a homogeneous solution, 12 M hydrochloric acid (16.6 mL) was added, and the reaction was carried out at room temperature for 24 hours. The reaction mixture was filtered to collect the precipitate. The precipitate was washed with methanol and with pure water, and was then dried under vacuum overnight (60° C.) to obtain a monomer 2 (white solid) as shown in the following formula in a yield of 65%.

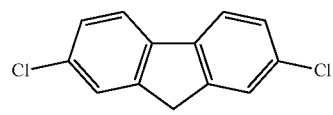 [SMILES: Clc1ccc2c(c1)Cc1cc(Cl)ccc1-2]

<Synthesis of Monomer 3>

To a 300 mL three-necked round-shaped flask were added the monomer 2 (8.23 g, 35.0 mmol) and 1,6-dibromohexane (53 mL). After the mixture was stirred to form a homogeneous solution, a mixed solution of tetrabutylammonium (2.26 g, 7.00 mmol), potassium hydroxide (35.0 g) and pure water (35 mL) were added, and the reaction was carried out at 80° C. for 1 hour. The reaction was quenched by adding pure water to the reaction solution. The target compound was extracted with dichloromethane from the water phase. The combined organic phase was washed with pure water and with sodium chloride solution, and then water, dichloromethane, and 1,6-dibromohexane were distilled off. The crude product was purified by column chromatography on silica gel (eluent: dichlorometane/hexane=1/4), and was then dried under vacuum overnight (60° C.) to obtain a monomer 3 (pale yellow solid) as shown in the following formula in a yield of 75%.

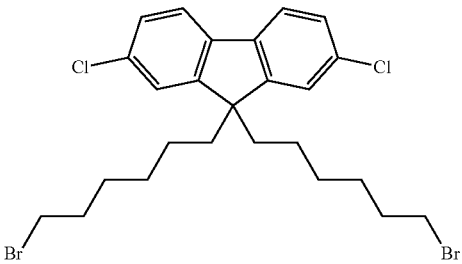 [SMILES: Clc1ccc2c(c1)C(CCCCCCBr)(CCCCCCBr)c1cc(Cl)ccc1-2]

<Synthesis of Monomer 4-1>

To a 50 mL three-necked round-shaped flask were added the monomer 3 (2.8 g, 5.0 mol) and tetrahydrofuran (25 mL). After the mixture was stirred to form a homogeneous solution, piperidine (5.0 mL, 50 mmol) was added. The reaction was carried out at 40° C. for 48 hours. The reaction was quenched by adding an aqueous solution of sodium hydroxide to the reaction solution. The target ingredient was extracted by removing tetrahydrofuran from the solution and then adding hexane to the solution. The organic phase was washed with sodium chloride solution, and then water and hexane were distilled off. The resulting product was dried under vacuum overnight at 40° C. to obtain a monomer 4-1 as shown in the following formula (pale yellow solid) in a yield of 91%.

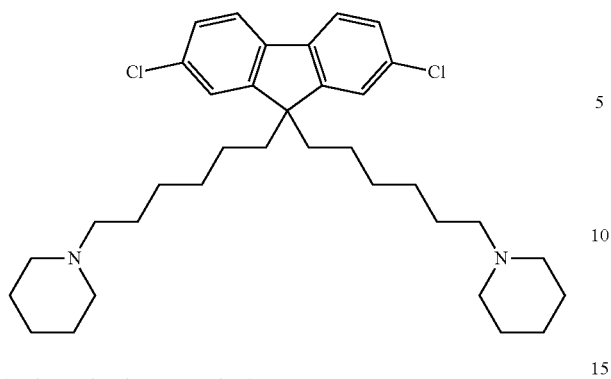

(Polymerization Reaction)

To a 100 mL three-necked round-shaped flask equipped with a nitrogen inlet and a condenser were added the monomer 1 (1.2 g, 2.3 mmol), the monomer 4-1 (0.77 g, 1.3 mmol), 2,2'-bipyridine (1.4 g, 9.1 mmol), and N,N-dimethylacetamide (9.1 mL). After the mixture was stirred to form a homogeneous solution, bis(1,5-cyclooctadiene)nickel(0) (2.5 g, 9.1 mmol) was added, and the reaction was carried out at 80° C. for 3 hours. The reaction was quenched by adding the reaction mixture dropwise to a mixed solution of methanol and 12 M hydrochloric acid(methanol/12 M hydrochloric acid=1/1). The reaction mixture was filtered to collect the precipitate. The precipitate was washed with 12 M hydrochloric acid, with 0.2 M potassium carbonate and with pure water, and was then dried under vacuum overnight (60° C.) to obtain a precursor polymer for the anion exchange resin PAF-4 (Pip) (yellow solid) as shown in the following formula in a yield of 97%.

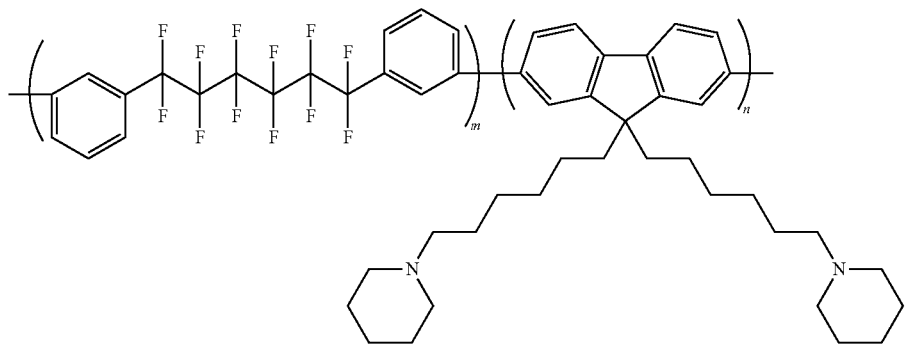

(Quaternizing Reaction, Formation of Membrane, and Ion Exchange)

To a 50 mL three-necked round-shaped flask were added the precursor polymer for the anion exchange resin PAF-4 (Pip) (1.50 g) and N,N-dimethylacetamide (7.7 mL). After the mixture was stirred to form a homogeneous solution, dimethyl sulfate (0.60 mL, 5.8 mmol) was added, and the reaction was carried out at room temperature for 48 hours. N,N-dimethylacetamide (10 mL) was added to the reaction solution, and the reaction was quenched by adding the reaction mixture dropwise to pure water. By collecting a precipitate from the mixture by filtering, by washing the collected precipitate with pure water, and then by drying the precipitate under vacuum (60° C.) overnight, the anion exchange resin QPAF-4 (Pip) as shown the following formula (m/n=1/0.63, IEC=1.56 meq./g, hydroxide ion type) was obtained.

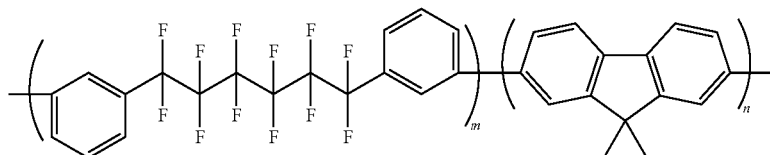

Comparative Example: Synthesis of Anion Exchange Resin QPAF-4 (TM)

<Synthesis of Monomer 4-2>

To a 300 mL three-necked round-shaped flask were added the monomer 3 (13.2 g, 23.4 mmol) and tetrahydrofuran (117 mL). After the mixture was stirred to form a homogeneous solution, 40 wt % dimethylamine aqueous solution (58.6 mL) was added, and the reaction was carried out at room temperature for 24 hours. The reaction was quenched by adding a saturated solution of sodium hydrogen carbonate in water to the reaction solution. Tetrahydrofuran was removed from the solution and then the target ingredient was extracted by adding hexane. The organic phase was washed with sodium chloride solution, and then water and hexane were distilled off. The resulting product was dried under vacuum overnight at 40° C. to obtain a monomer 4-2 (pale yellow solid) as shown in the following formula in a yield of 75%.

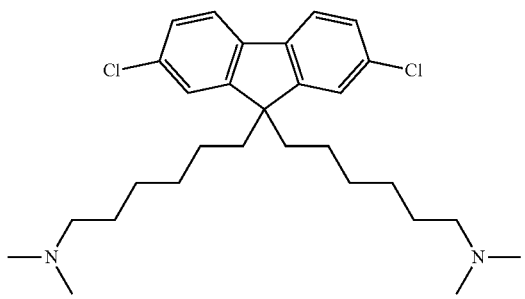

(Polymerization Reaction)

To a 100 mL three-necked round-shaped flask equipped with a nitrogen inlet and a condenser were added the monomer 1 (1.52 g, 2.91 mmol), the monomer 4-2 (0.82 g, 1.67 mmol), 2,2'-bipyridine (1.70 g, 10.9 mmol), and N,N-dimethylacetamide (11 mL). After the mixture was stirred to form a homogeneous solution, bis(1,5-cyclooctadiene)nickel(0) (3.00 g, 10.9 mmol) was added, and the reaction was carried out at 80° C. for 3 hours. The reaction was quenched by adding the reaction mixture dropwise to a mixed solution of methanol and 12 M hydrochloric acid (methanol/12 M hydrochloric acid=1/1). The reaction mixture was filtered to collect the precipitate. The precipitate was washed with 12 M hydrochloric acid, with 0.2 M potassium carbonate and with pure water, and was then dried under vacuum overnight (60° C.) to obtain a precursor polymer for the anion exchange resin PAF-4 (TM) (yellow solid) as shown in the following formula in a yield of 96%.

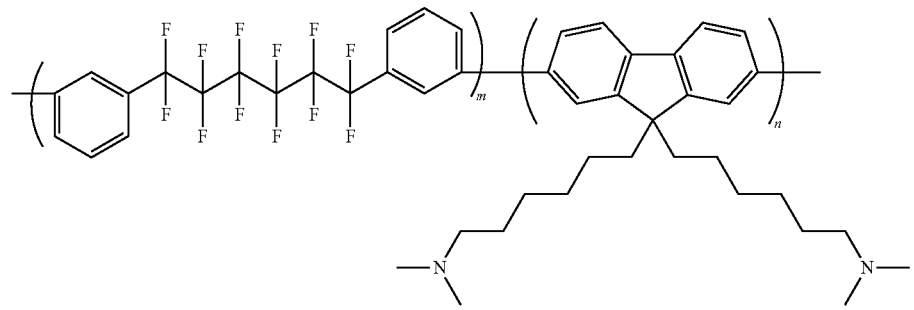

(Quaternizing Reaction, Forming of Membrane, and Ion Exchange)

To a 50 mL three-necked round-shaped flask were added the precursor polymer for the anion exchange resin PAF-4 (TM) (1.70 g) and N,N-dimethylacetamide (9.6 mL). After the mixture was stirred to form a homogeneous solution, methyl iodide (0.45 mL, 7.22 mmol) was added, and the reaction was carried out at room temperature for 48 hours. N,N-dimethylacetamide (10 mL) was added to the reaction solution, and the solution was filtered. The filtrate was poured into a glass plate wound with silicone rubber and was kept on a hot plate adjusted so as to be oriented horizontally at 50° C., for drying. The resulting membrane was washed with pure water (2 L), and was then dried under vacuum overnight (60° C.) to obtain a transparent membrane having pale brown color. Further, the counter-ion of the anion exchange group (quaternary ammonium group) in the membrane was converted from iodide ion to hydroxide ion by immersing it in 1 M aqueous potassium hydroxide solution for 48 hours and by washing it with degassed pure water. By the reaction, a membrane of an anion exchange resin QPAF-4 (TM) as shown the following formula (m/n=1/0.60, IEC=1.47 meq./g, hydroxide ion type) was obtained.

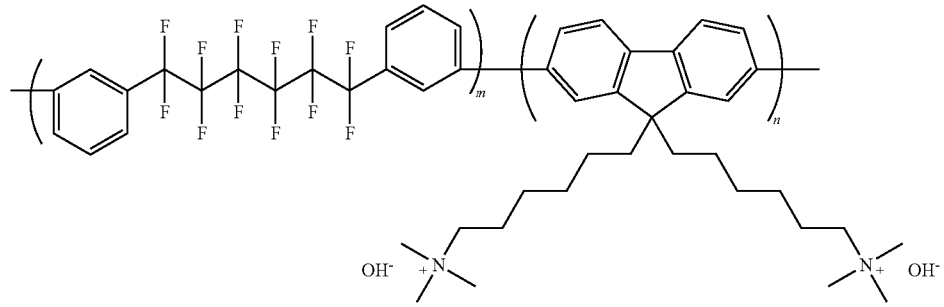

<Durability Test>

Figure 2:
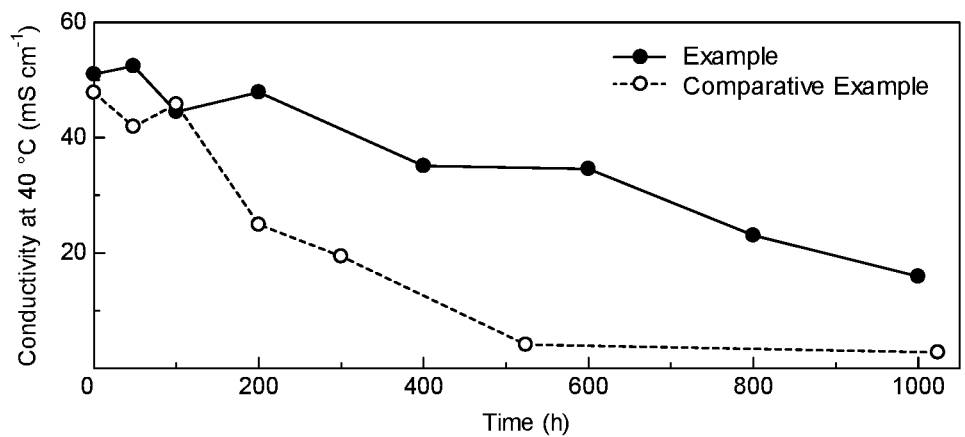
FIG. 2 is a graph showing the results of changing hydroxide ion conductivity over time for each sample obtained in the Examples and the Comparative Examples.

The durability tests were performed for the membranes of the anion exchange resins obtained in the Example and the Comparative Example. Specifically, the hydroxide ion conductivities of the membranes of the anion exchange resin (hydroxide ion type) were measured over time when the membranes were immersed in 8 M aqueous potassium hydroxide solution (80° C.) for 1000 hours. The resulting the membranes of the anion exchange resin were cut into a piece having a width of 1 cm and a length of 3 cm as a test sample. Hydroxide ion conductivities were measured by four-terminal method using alternating current (300 mV, 10-100000 Hz) in water at 40° C. after the sample was pulled up from 8 M aqueous potassium hydroxide solution (80° C.) and was washed with degassed pure water. Solartolon 12556/1287 was used as the apparatus for the measurement, and a gold wire having a diameter of 1 mm was used as the probe. The hydroxide ion conductivity a (mS/cm) was calculated from the distance between probes L (1 cm), the impedance Z (0), and the cross-sectional area of the membrane A ($cm^2$). The results are shown in FIG. 2.

As described above, the anion exchange resin obtained in the Example exhibits that the decrease in hydroxide ion conductivity by the durability test is prevented and that the chemical properties (durability, in particular, alkali resistance) are improved, compared to the anion exchange resin obtained in the Comparative Example.

DENOTATION OF REFERENCE NUMERALS 1 fuel cell
2 fuel side electrode
3 oxygen side electrode
4 electrolyte membrane
5cell for the fuel cell

What is claimed is:

1. An anion exchange resin, comprising:
a hydrophobic unit being composed of a divalent hydrophobic group alone, or being composed of a plurality of divalent hydrophobic groups repeated via ether bond, thioether bond, or carbon-carbon bond; and
a hydrophilic unit being composed of a divalent hydrophilic group alone containing an anion exchange group-containing group, or being composed of a plurality of divalent hydrophilic groups containing an anion exchange group-containing group repeated via ether bond, thioether bond, or carbon-carbon bond;
wherein the anion exchange group-containing group is represented by the following formula (A) or (B); and
wherein the hydrophobic unit and the hydrophilic unit are connected via ether bond, thioether bond, or carbon-carbon bond;

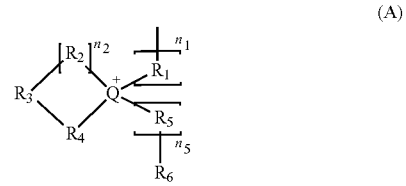

(A)

(In the formula (A), $R_1$, $R_2$, $R_3$, $R_4$, $R_5$, and $R_6$ are the same or different and represent carbon atom or silicon atom connected with hydrogen atom, a halogen atom, or a pseudohalide; Q represents nitrogen atom or phosphorus atom; and $n_1$, $n_2$, and $n_5$ are the same or different and represent an integer of 0 or more)

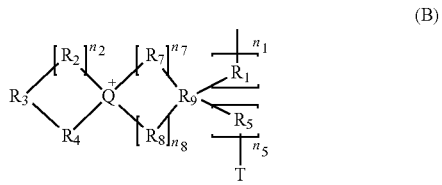

(B)

(In the formula (B), $R_1$, $R_2$, $R_3$, $R_4$, $R_5$, $R_7$, and $R_8$ are the same or different and represent carbon atom or silicon atom connected with hydrogen atom, a halogen atom, or a pseudohalide; $R_9$ represents carbon atom or silicon atom; Q represents nitrogen atom or phosphorus atom; T represents hydrogen atom, a halogen atom, or a pseudohalide; and $n_1$, $n_2$, $n_5$, $n_7$, and $n_8$ are the same or different and represent an integer of 0 or more).

2. The anion exchange resin according to claim 1, wherein the anion exchange group-containing group is represented by the following formula (A2) or (B2)

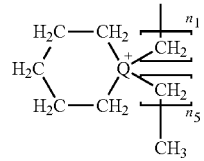

(A2)

(In the formula, Q represents nitrogen atom or phosphorus atom; and $n_1$ and $n_5$ are the same or different and represent an integer of 0 or more)

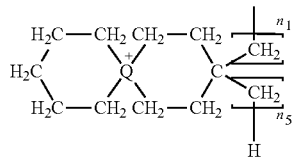

(B2)

(In the formula, Q represents nitrogen atom or phosphorus atom; and $n_1$ and $n_5$ are the same or different and represent an integer of 0 or more).

3. The anion exchange resin according to claim 1,
wherein the hydrophobic group is composed of one aromatic ring, or is composed of a plurality of aromatic rings which are connected to each other by a divalent hydrocarbon group, a divalent silicon-containing group, a divalent nitrogen-containing group, a divalent phosphorus-containing group, a divalent oxygen-containing group, a divalent sulfur-containing group, or carbon-carbon bond; and
wherein the hydrophilic group is composed of one aromatic ring, or being composed of a plurality of aromatic rings which are connected to each other via a linking group and/or carbon-carbon bond, wherein the linking group is a divalent hydrocarbon group, a divalent silicon-containing group, a divalent nitrogen-containing group, a divalent phosphorus-containing group, a divalent oxygen-containing group, or a divalent sulfur-containing group, and at least one of the linking group or the aromatic ring is connected to the anion exchange group-containing group.

4. The anion exchange resin according to claim 3, wherein the hydrophobic group comprises a bisphenol residue which is substituted with a halogen atom, a pseudohalide, an alkyl group, or an aryl group, as shown in the following formula (2)

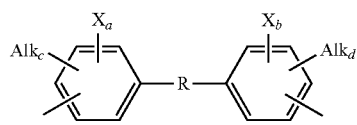

(2)

(In the formula, R represents a hydrocarbon group, a silicon-containing group, a nitrogen-containing group, a phosphorus-containing group, an oxygen-containing group, a sulfur-containing group, an aromatic group, or direct bond, each of which may be substituted with a halogen atom or a pseudohalide; each Alk is the same or different and represents an alkyl group or an aryl group; each X is the same or different and represents a halogen atom or a pseudohalide; and a, b, c, and d are the same or different and represent an integer of 0 to 4).

5. The anion exchange resin according to claim 4, wherein the hydrophobic group comprises a bisphenol residue which is substituted with a halogen atom, a pseudohalide, an alkyl group, or an aryl group, as shown in the following formula (1)

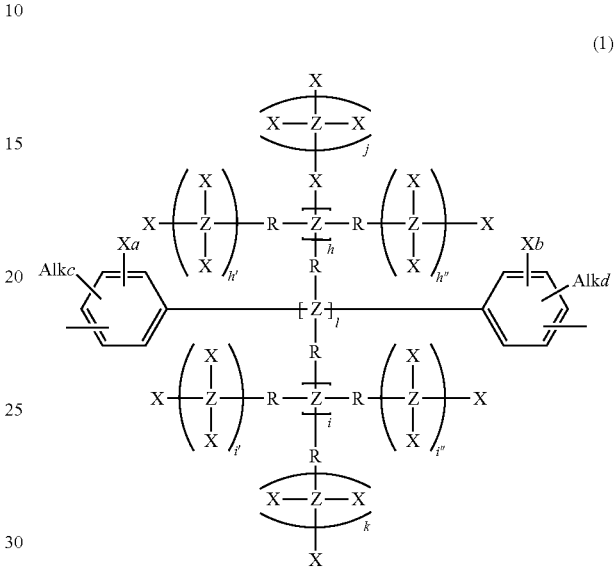

(1)

(In the formula, Alk, X, a, b, c, and d have the same meaning as Alk, X, a, b, c, and d in the formula (2); each Z is the same or different and represents carbon atom or silicon atom; each R is the same or different and represents a silicon-containing group, a nitrogen-containing group, a phosphorus-containing group, an oxygen-containing group, a sulfur-containing group, or direct bond; l represents an integer of 1 or more; h, h', h", i, i', i", j, and k are the same or different and represent an integer of 0 or more).

6. The anion exchange resin according to claim 5, wherein, in the formula (1), Z is carbon atom; R is direct bond; X is fluorine atom; and h, h', h", i, i', i", j, and k are 0.

7. The anion on exchange resin according to claim 2,
wherein the hydrophobic group is composed of one aromatic ring, or is composed of a plurality of aromatic rings which are connected to each other by a divalent hydrocarbon group, a divalent silicon-containing group, a divalent nitrogen-containing group, a divalent phosphorus-containing group, a divalent oxygen-containing group, a divalent sulfur-containing group, or carbon-carbon bond; and
wherein the hydrophilic group is composed of one aromatic ring, or being composed of a plurality of aromatic rings which are connected to each other via a linking group and/or carbon-carbon bond, wherein the linking group is a divalent hydrocarbon group, a divalent silicon-containing group, a divalent nitrogen-containing group, a divalent phosphorus-containing group, a divalent oxygen-containing group, or a divalent sulfur-containing group, and at least one of the linking group or the aromatic ring is connected to the anion exchange group-containing group.

8. The anion exchange resin according to claim 7, wherein the hydrophobic group comprises a bisphenol residue which is substituted with a halogen atom, a pseudohalide, an alkyl group, or an aryl group, as shown in the following formula (2)

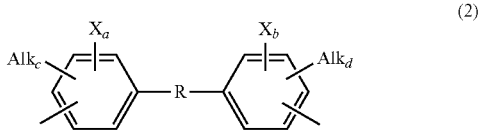

(In the formula, R represents a hydrocarbon group, a silicon-containing group, a nitrogen-containing group, a phosphorus-containing group, an oxygen-containing group, a sulfur-containing group, an aromatic group, or direct bond, each of which may be substituted with a halogen atom or a pseudohalide; each Alk is the same or different and represents an alkyl group or an aryl group; each X is the same or different and represents a halogen atom or a pseudohalide; and a, b, c, and d are the same or different and represent an integer of 0 to 4).

9. The anion exchange resin according to claim 8, wherein the hydrophobic group comprises a bisphenol residue which is substituted with a halogen atom, a pseudohalide, an alkyl group, or an aryl group, as shown in the following formula (1)

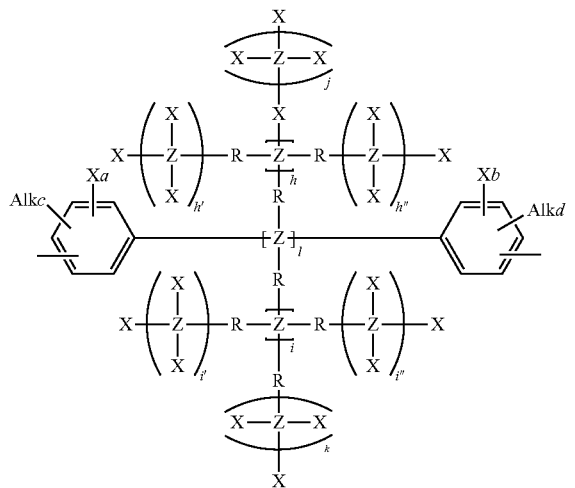

(In the formula, Alk, X, a, b, c, and d have the same meaning as Alk, X, a, b, c, and d in the formula (2); each Z is the same or different and represents carbon atom or silicon atom; each R is the same or different and represents a silicon-containing group, a nitrogen-containing group, a phosphorus-containing group, an oxygen-containing group, a sulfur-containing group, or direct bond; l represents an integer of 1 or more; h, h', h", i, i', i", j, and k are the same or different and represent an integer of 0 or more).

10. The anion exchange resin according to claim 9, wherein, in the formula (1), Z is carbon atom; R is direct bond; X is fluorine atom; and h, h', h", i, i', i", j, and k are 0.

11. The anion exchange resin according to claim 1, wherein the hydrophilic group is composed of one polycyclic compound, or is composed of a plurality of polycyclic compounds which are connected to each other via a linking group and/or carbon-carbon bond, wherein the linking group is a divalent hydrocarbon group, a divalent silicon-containing group, a divalent nitrogen-containing group, a divalent phosphorus-containing group, a divalent oxygen-containing group, or a divalent sulfur-containing group.

12. The anion exchange resin according to claim 11, wherein the hydrophilic group comprises a fluorene residue as shown in the following formula (3)

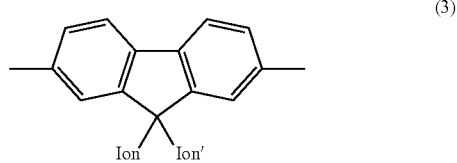

(In the formula, Ion and Ion' are the same or different and represent an anion exchange group-containing group).

13. The anion exchange resin according to claim 2, wherein the hydrophilic group is composed of one polycyclic compound, or is composed of a plurality of polycyclic compounds which are connected to each other via a linking group and/or carbon-carbon bond, wherein the linking group is a divalent hydrocarbon group, a divalent silicon-containing group, a divalent nitrogen-containing group, a divalent phosphorus-containing group, a divalent oxygen-containing group, or a divalent sulfur-containing group.

14. The anion exchange resin according to claim 13, wherein the hydrophilic group comprises a fluorene residue as shown in the following formula (3)

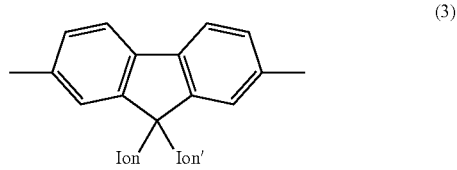

(In the formula, Ion and Ion' are the same or different and represent an anion exchange group-containing group).

15. The anion exchange resin according to claim 3, wherein the hydrophilic group is composed of one polycyclic compound, or is composed of a plurality of polycyclic compounds which are connected to each other via a linking group and/or carbon-carbon bond, wherein the linking group is a divalent hydrocarbon group, a divalent silicon-containing group, a divalent nitrogen-containing group, a divalent phosphorus-containing group, a divalent oxygen-containing group, or a divalent sulfur-containing group.

16. The anion exchange resin according to claim 15, wherein the hydrophilic group comprises a fluorene residue as shown in the following formula (3)

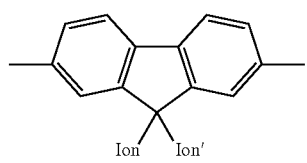

(3)

(In the formula, Ion and Ion' are the same or different and represent an anion exchange group-containing group).

17. The anion exchange resin according to claim 7, wherein the hydrophilic group is composed of one polycyclic compound, or is composed of a plurality of polycyclic compounds which are connected to each other via a linking group and/or carbon-carbon bond, wherein the linking group is a divalent hydrocarbon group, a divalent silicon-containing group, a divalent nitrogen-containing group, a divalent phosphorus-containing group, a divalent oxygen-containing group, or a divalent sulfur-containing group.

18. The anion exchange resin according to claim 17, wherein the hydrophilic group comprises a fluorene residue as shown in the following formula (3)

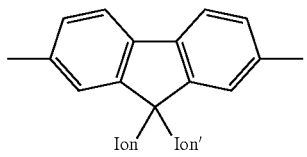

(3)

(In the formula, Ion and Ion' are the same or different and represent an anion exchange group-containing group).

19. An electrolyte membrane, comprising the anion exchange resin according to claim 1.

20. A binder for forming an electrode catalyst layer, comprising the anion exchange resin according to claim 1.

* * * * *